United States Patent [19]
Hawley et al.

[11] Patent Number: 5,770,143
[45] Date of Patent: Jun. 23, 1998

[54] METHOD FOR LIQUID THERMOSETTING RESIN MOLDING USING RADIOFREQUENCY WAVE HEATING

[75] Inventors: Martin C. Hawley, East Lansing; Jes Asmussen, Jr., Okemos, both of Mich.; Jianghua Wei, Raleigh, N.C.; Trent A. Shidaker, Brighton, Mich.

[73] Assignee: Board of Trustees operating Michigan State University, East Lansing, Mich.

[21] Appl. No.: 675,608

[22] Filed: Jul. 3, 1996

[51] Int. Cl.$^6$ .............................. H05B 6/64; B29C 67/00
[52] U.S. Cl. ...................... 264/404; 264/101; 264/478; 264/490; 264/491; 264/489; 219/746; 219/759; 425/174.8 R
[58] Field of Search ................................... 264/402, 403, 264/478, 489, 490, 491, 404, 101; 425/174.8 R; 219/746, 750, 759, 734, 735

[56] References Cited

U.S. PATENT DOCUMENTS

| | | | |
|---|---|---|---|
| 4,083,903 | 4/1978 | Gilbert et al. | 264/40.3 |
| 4,181,510 | 1/1980 | Sano et al. | 55/183 |
| 4,247,519 | 1/1981 | Sano | 422/169 |
| 4,323,745 | 4/1982 | Breggren | 219/10.55 A |
| 5,008,506 | 4/1991 | Asmussen et al. | 219/10.55 M |
| 5,406,056 | 4/1995 | Hawley et al. | 219/693 |
| 5,410,135 | 4/1995 | Pollart et al. | 219/730 |

OTHER PUBLICATIONS

Wei, J., Ph.D. dissertation, Michigan State University, pp. 31–77 (1992).
Wei, J., Chang, Y., Thomas, B.J. and Hawley, M.C., Microwave Heating of Thicksection Graphite Fiber/Epoxy Composites, Proc. of ICCM/VIII (10–L) (1991).
Jow, J., et al, Microwave Processing and Diagnosis of Chemically Reacting Materials . . . IEEE Microwave Theory and Techniques, 35(12), pp. 1435–1443 (1987).
Jow, J., et al, Microwave Heating and Dielectric Diagnosis Technique in a Single–Mode Resonant Cavity, Rev. Sci. Instrum., 60(1), pp. 96–103 (1989).
Outifa, L., et al, Buildup and Optimization of a Homogeneous Microwave Curing Process for Epoxy–Glass Composites, Ind. Eng. Chem. Res., 34(2) 688–698 (1995).
Strand, N.S., Microwave Polymerization of Thermoset Resins Utilizing Microwave Transparent Tooling, SPI 35t Annual Tech. Conf. Proc. 24–C 1–4 (1980).

Primary Examiner—Jan H. Silbaugh
Assistant Examiner—Suzanne E. Mason
Attorney, Agent, or Firm—Ian C. McLeod

[57] ABSTRACT

A method and apparatus for liquid thermoset resin or polymer molding using electromagnetic waves (particularly radiofrequency waves or microwaves), is described. The method and apparatus uses a metal mold (10, 212) with a cavity (401) for the molding as well as for confinement of the electromagnetic waves. Multiple low loss ports (A, B, C, D, E, p1, p2, p3) are provided for introducing the microwaves into the cavity.

11 Claims, 23 Drawing Sheets

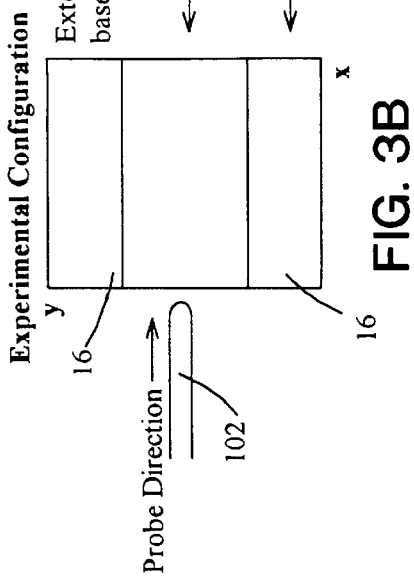
FIG. 3A
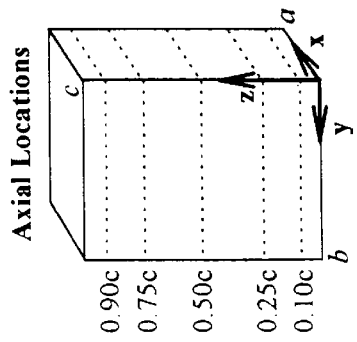
FIG. 3B
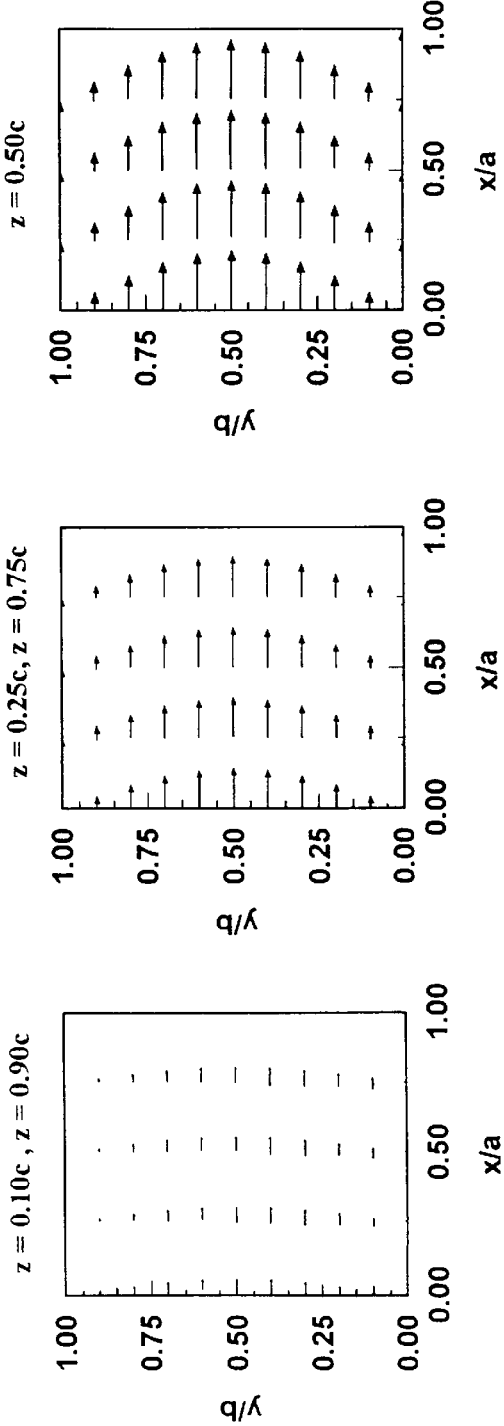
FIG. 3C
FIG. 3D
FIG. 3E $TE_{10}$ $TE_{20}$ $TE_{01}$ $TE_{11}$ $TM_{11}$ $TE_{21}$ $TM_{21}$

METHOD FOR LIQUID THERMOSETTING RESIN MOLDING USING RADIOFREQUENCY WAVE HEATING

GOVERNMENT RIGHTS

This invention was made with government support under Grant No. 9108846 by the National Science Foundation. The government has certain rights in the invention.

BACKGROUND OF THE INVENTION (1) Summary of Invention

The present invention relates to a method and apparatus for processing liquid thermosetting resin using radiofrequency wave ($\lambda \sim 1$ m–1 km) or microwave ($\lambda \sim 1$ mm–1 m) heating. In particular, the present invention relates to a method and apparatus wherein a metal chamber provides both a mold for the liquid resin and a cavity for such electromagnetic waves, which are preferably microwaves. The metal mold is constructed to withstand the pressures of resin injection or transfer molding and can achieve high production rates.

(2) Description of Related Art

For most conventional liquid molding techniques used to manufacture thermoset articles, activation of the cross-linking relies on conduction heating from hot mold surfaces. Heat transfer across the part surfaces inherently forms large temperature gradients, particularly in composite systems with thick cross-sections. Residual thermal stresses can originate from these large temperature gradients, diminishing the mechanical properties of the processed article. Additionally, production of thick cross-section parts requires longer cycle times due to the long curing stage.

Composite polymers have successfully been cured using a microwave resonant cavity. (Wei, J., Ph.D. dissertation, Michigan State University, pp. 31–77 (1992)). This reference discusses several benefits of microwave processing of thermosets including enhanced cure kinetics and larger glass transition temperature for DGEBA/DDS and DGEBA/m-PDA systems. (Wei, J., Chang, Y., Thomas, B. J. and Hawley, M. C., "Microwave Heating of Thicksection Graphite Fiber/Epoxy Composites", *Proceedings of ICCM/VII*, 1(10-L) (1991)). This reference discusses graphite-reinforced epoxy samples cured in a single-mode applicator and the capability of curing components with a thick cross-section. (Jow, J., Hawley, M. C., Finzel, M., Asmussen, J., Lin, H. H. and Manring, B., "Microwave Processing and Diagnosis of Chemically Reacting Materials in a Single-Mode Cavity Applicator", *IEEE Microwave Theory and Techniques*, 35(12), pp. 1435–1443 (1987)). (Jow, J., Hawley, M. C., Finzel, M. and Asmussen, J., "Microwave Heating and Dielectric Diagnosis Technique in a Single-Mode Resonant Cavity", *Rev. Sci. Instrum.*, 60(1), pp. 96–103 (1989)). These references discuss the apparatus and technique for measuring the dielectric properties of a material. The molds are fabricated with microwave "transparent" materials, such as Teflon, quartz, or pure polyethylene, to the desired part geometry, charged with the process material, and placed in a cylindrical microwave resonant cavity. However, most transparent mold materials do not possess the mechanical properties necessary to maintain integrity for a liquid resin molding process using pressure at high production rates. Some low loss materials, such as reinforced polyimide, can provide the required mechanical properties; however, the use of polyimide as a mold is cost prohibitive.

U.S. Pat. No. 4,323,745 to Breggren describes a multiple port cavity for use with microwaves provided in the cavity at different frequencies for uniform heating. The problem is that the mold is made of a ceramic material which is transparent to the microwaves. The ceramic material is relatively thick and lines the complete cavity. Such a mold may not be suitable for high production rates. The brittleness of ceramic makes this material susceptible to chipping in an industrial environment. (Outifa, L., Jullien, H., More, C. and Delmotte, M., "Buildup and Optimization of a Homogeneous Microwave Curing Process for Epoxy-Glass Composites", *Ind. Eng. Chem. Res.*, 34(2), pp. 688–698 (1995)). The reference discusses electromagnetic wave propagation through a traveling wave applicator. The applicator is a partially filled glass-reinforced epoxy composite; the applicator wall is lined with a dielectric material. Theoretical issues such as reflection at interfaces, dielectric transition materials and waveguide cutoff frequency are presented. Additionally, glass-reinforced epoxy samples are cured and heating patterns are mapped on thermal paper to characterize the applicator performance. (Strand, N.S., "Microwave Polymerization of Thermoset Resins Utilizing Microwave Transparent Tooling", *SPI 35th Annual Technical Conference Proceedings*, 24-C pp. 1–4, (1980)). This reference demonstrates the progress of microwave tooling. In the article, it is claimed that microwave transparent dies are required for any microwave curing process.

OBJECTS

It is therefore an object of the present invention to provide an improved apparatus and method for providing pressure during the processing of liquid thermosetting resins which provides high production rates. Further, it is an object of the present invention to provide a method which is economical and reliable. These and other objects will become increasingly apparent by reference to the following description and these drawings.

BRIEF DESCRIPTION OF THE DRAWINGS

FIG. 1A is a top view, FIG. 1B is a front view, FIG. 1C is a bottom view, FIG. D is a right end view and FIG. 1E is a left end view.

FIGS. 3A to 3E are graphs showing vector plots of the theoretical E-field for the $TE_{011}$ mode and the probe and aperture configuration in the external applicator 100.

DESCRIPTION OF PREFERRED EMBODIMENTS

Figure 1D:
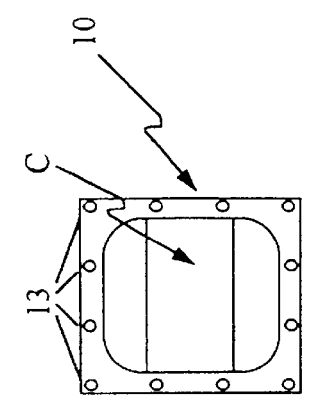
FIGS. 1A to 1E are drawings of a metal mold 10 with ports A, B, C, D and E for mounting external applicators 100 (FIG. 2), sprue hole for resin transfer 11, threaded holes 13 to affix external applicators 100, diagnostic holes 14, resistive heaters 15 and vents 18.
Figure 1A:
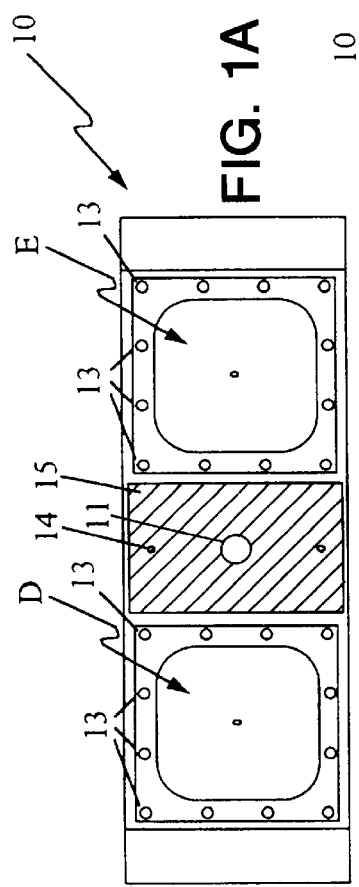
Figure 1B:
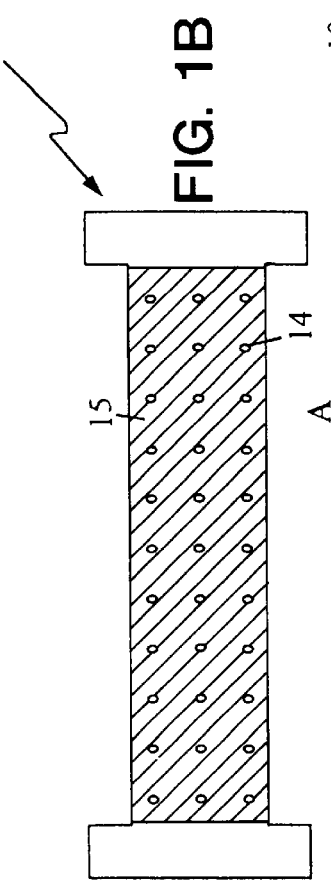
Figure 1C:
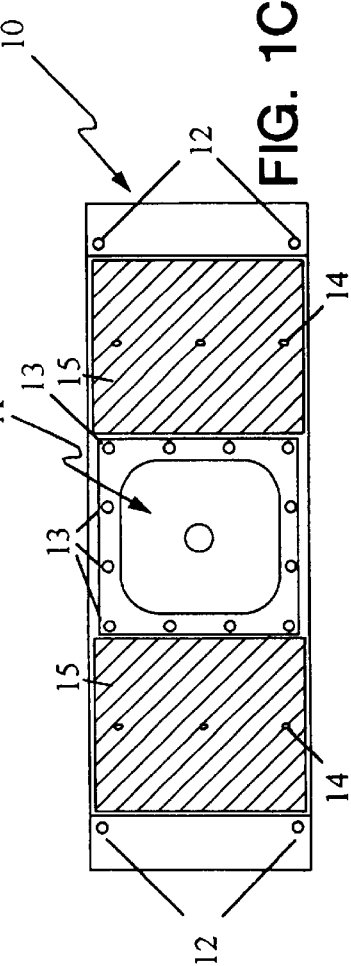
Figure 1E:
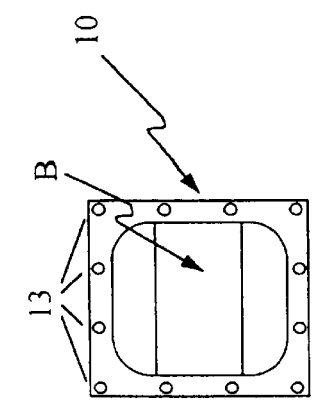

The present invention relates to a method for forming an article of a cured thermoset polymer which comprises: providing a mold with metal walls defining a cavity, with an injection port for introducing a curable liquid polymer composition into the mold, with multiple ports with covers which allow transmission of electromagnetic waves selected from the group consisting of radiofrequency waves and microwaves into the cavity and with means for removing gas from the mold before or during injection; introducing the curable liquid resin composition through the injection port into the mold; heating to induce curing of the resin by the electromagnetic waves through the multiple ports so as to provide uniform heating in the cavity of the mold and to provide the article; and removing the article from the mold.

The present invention also relates to an apparatus for forming a cured resin article which comprises: a mold with metal walls defining a cavity, with an injection port for introducing a curable liquid polymer composition into the mold, with means for removing gas from the mold before or during the injection and with multiple ports into the mold for introducing electromagnetic waves selected from the group consisting of radiofrequency waves and microwaves into the mold; dielectric covers over the ports which allow transmission of the electromagnetic waves into the cavity; and multiple microwave applicators mounted over the ports for introducing the electromagnetic waves into the mold, wherein the electromagnetic waves provide uniform curing of a liquid resin in the cavity of the mold to produce the article.

Microwave or radiofrequency wave processing is more efficient than conventional thermal processing because the microwave or radiofrequency wave energy is coupled with the material directly on the molecular level, bypassing the air medium in the cavity. Such electromagnetic (EM) processing also has potential for rapid processing of thick-section composites. Electromagnetic processing scales with wavelength or frequency; e.g., the same resonant modes in a 17.8 cam cylindrical cavity at 2.45 GHz can be attained in a 45.7 cm cylindrical cavity at 915 MHz. Microwave processing of homogeneous, isotropic, lossy materials, such as matrices and glass fiber composites, was successfully scaled from 17.8 cm cavity to 45.7 cm cavity.

The features of EM processing versus thermal processing are summarized as follows: (1) EM processing is rapid and selective, (2) EM heating is believed to enhance reaction rate with the magnitude of enhancement depending on the curing agent (i.e. increased by factor of five for DGEBA/DDS and increased by 20 percent for DGEBA/MPDA); (3) EM processing increases Tg of cured epoxy resin, (4) the exothermic excursion can be controlled during EM processing of thermoset polymers, (5) conductive fibers are selectively heated during EM processing, (6) by EM heating it is possible to control the interface/interphase region in epoxy/graphite systems, (7) EM processing can be used to control the morphology in thermoplastic toughened epoxies, (8) rapid heating of thermoplastic composites can be realized by EM processing, (9) controlled-hybrid mode EM processing of small thin and thick-section composites with good properties has been demonstrated, (10) continuous EM processing of both conductive and non-conductive fiber-reinforced composites can be performed, (11) mode-switching techniques can be used to achieve uniform temperature when single modes fail to provide uniform heating, such as in cases of complex shaped composites or large parts, and (12) an automated cavity can be used to control the temperature profiles through mode-switching and changing input power level.

The invention uses a metallic mold as the microwave applicator in which the polymer or composite article is designed for microwave input to achieve a desired heating pattern inside the part. This allows the use of both microwave processing and metallic tooling. The objectives of this invention are: (1) design of the microwave applicator that has the shape of the composite part (i.e. use the metallic mold as the microwave cavity) to avoid non-metallic tooling, including the design of cavity, microwave coupling, tuning, pressure control device, and process cycle; and (2) engineering of the microwave input, frequency, and power level to achieve a desired heating pattern and rate.

In order to accommodate injection pressures for cyclic liquid composite molding processes, such as resin transfer molding (RTM) and structural reaction injection molding (SRIM), a metal (brass) microwave part-shaped cavity was designed. The cavity serves as the mold for the processed part and as the microwave applicator. As with other closed mold processes, the metal walls withstand high injection pressures and maintain structural integrity.

Figure 2:
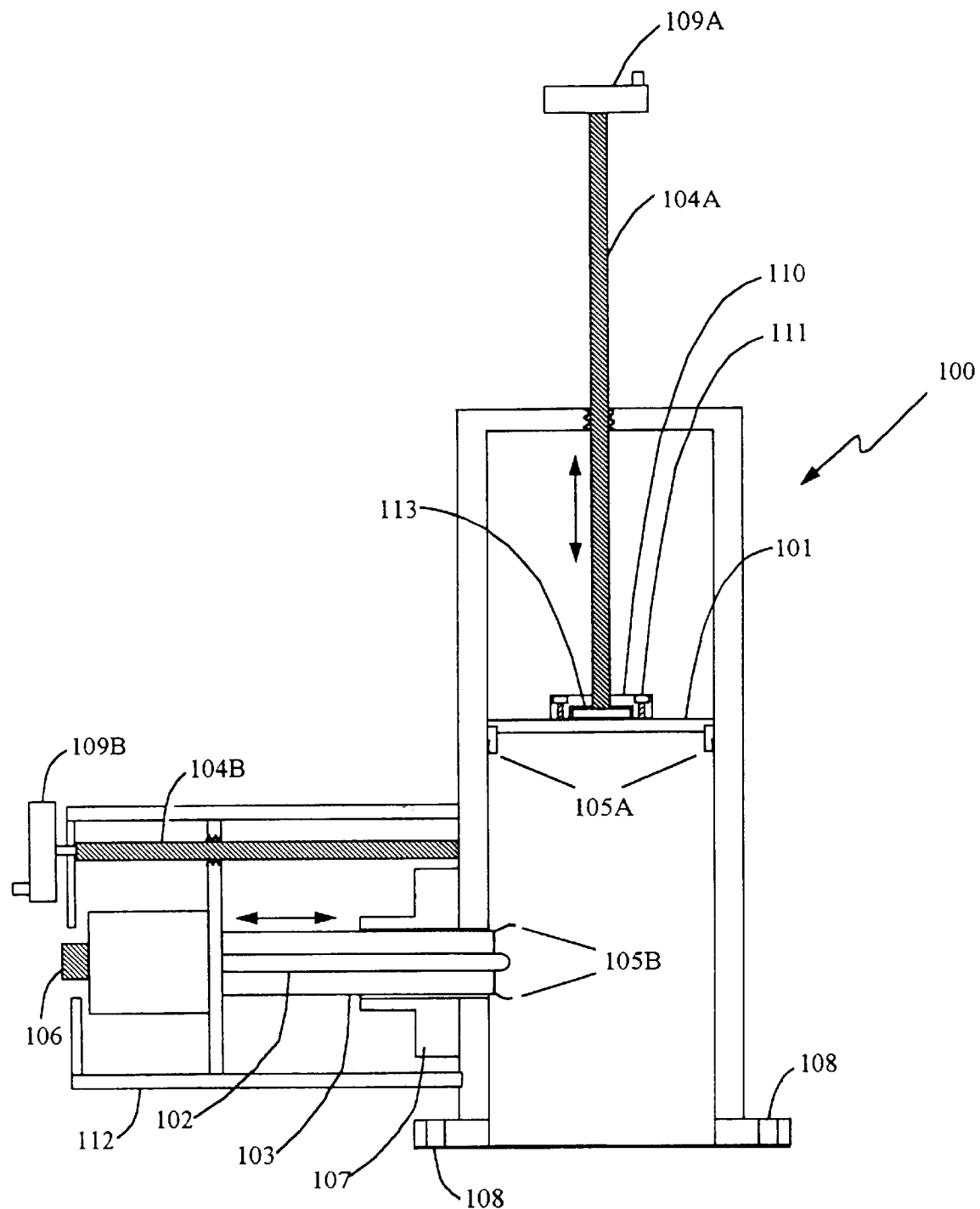
FIG. 2 is a front cross-sectional view of an external applicator 100 which can be mounted on ports A, B, C, D or E of the cavity 10 of FIG. 1, including traveling short 101, inner conductor 102, outer conductor 103, threaded shafts 104A and 104B, grounding contacts 105, type N coaxial connector 106 and choke 107.
Figure 3F:
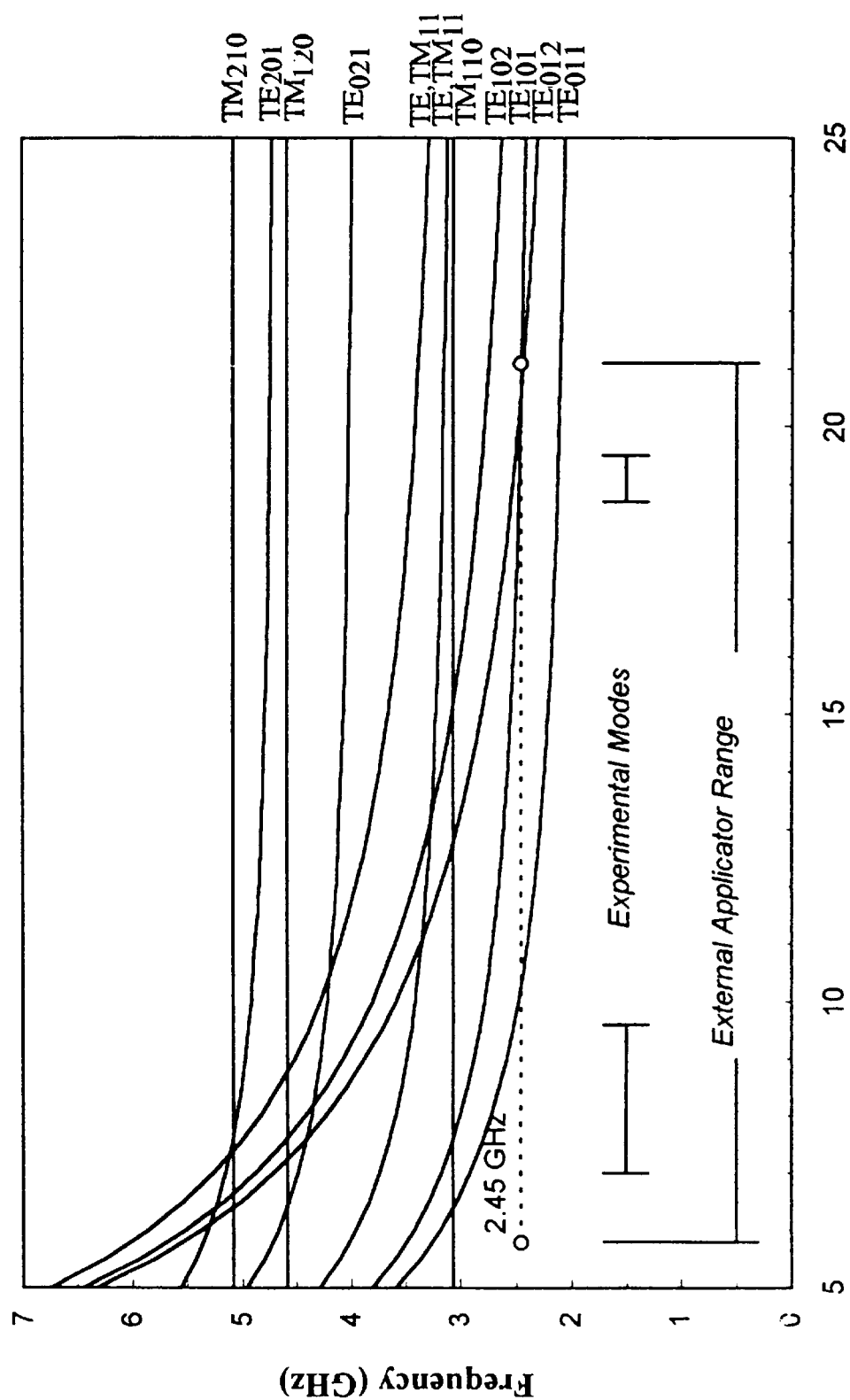
FIG. 3F illustrates the mode chart for a resonant cavity with the same cross-section as the external applicator. The external applicator is not a true cavity resonator due to the aperture near the base. The experiment cavity lengths are slightly less than theoretical.

As shown in Examples 1 to 7, the microwave processing system consists of four major components: microwave applicators, a microwave source and circuitry, process material, and a thermometry system. Microwave energy is admitted to the process material inside the brass part-shaped cavity 10, shown in FIG. 1, via external applicators 100, illustrated in FIG. 2. The part-shaped cavity 10 is capable of processing a 31.8 cm×8.7 cm×3.8 cm part.

An external applicator 100 can be secured to a centrally located port (i.e., port A), an end port (i.e., ports B or C), or an off-center port (i.e., ports D or E). Resonant conditions are attained in the external applicators 100 by mechanically adjusting the microwave coupling probe 102 depth and the external applicator 100 length. For each Example, the external applicators 100 were tuned to the $TE_{011}$ mode by minimizing reflected power near the theoretical $TE_{011}$ cavity length, 10.3 cm. Resonance in the external applicators 100 is affected by the dielectric properties of the material in the part-shaped cavity 10. Since the dielectric properties of the process material are functions of temperature, the external applicators 100 required slight tuning during each run to maintain heating efficiency. A microwave excitation probe 102, consisting of an aluminum inner conductor with a diameter of 0.95 cm and an outer brass conductor with a diameter of 2.26 cm, can be adjusted from a depth of 0 cm to 6.37 cm. A grounding contact ring 105 (Instrument Specialties 97–154, Delaware Water Gap, Pa.) is soldered to the outer conductor 103 to provide electrical contact with the external applicator 100 walls. The external applicator 100 length is fixed at 10.3 cm by a rectangular, 7.6 cm×6.4 cm, shorting plate 101 that is mechanically adjusted. Electrical contact between the external applicator 100 walls and the traveling short 101 is attained by grounding contact strips 105A (Instrument Specialties 97–139, Delaware Water Gap, Pa.) soldered to the perimeter of the short 101. Coupling from the external applicator 100 is achieved via an aperture plate 16 with a rectangular aperture 17. The aperture plates 16 in all Examples are oriented with the aperture 17 length (6.4 cm) parallel with the microwave excitation probe 102 as illustrated in FIGS. 3B, 4B, 4C and 4D. The aperture 17 width ranged from 3.61 cm to 4.19 cm.

Figure 4A:
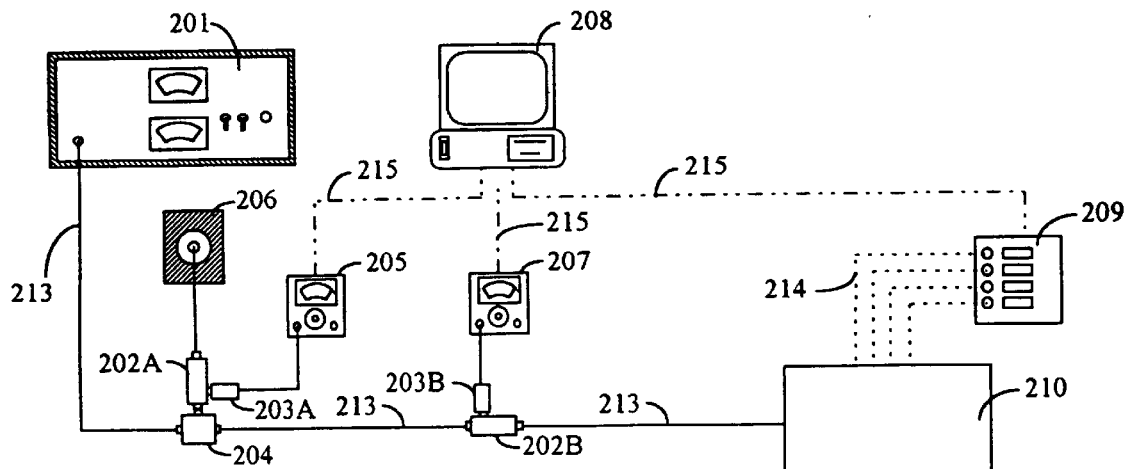
FIG. 4A is a schematic view of circuitry and hardware used for heating characterization with a 120 W magnetron hardware with a 120 W magnetron microwave generator 201; directional couplers 202A and 202B; power sensors 203A and 203B, circulator 204, reflected power meter 205, terminal resistor 206, input power meter 207, computer 208, LUXTRON thermometry system 209, part-shaped cavity with external applicator 210, external applicator 211, partshaped cavity 212. The solid lines are coaxial transmission lines. The dotted lines are silica temperature probes. The dot-dash lines are computer data transmission lines.
Figure 5:
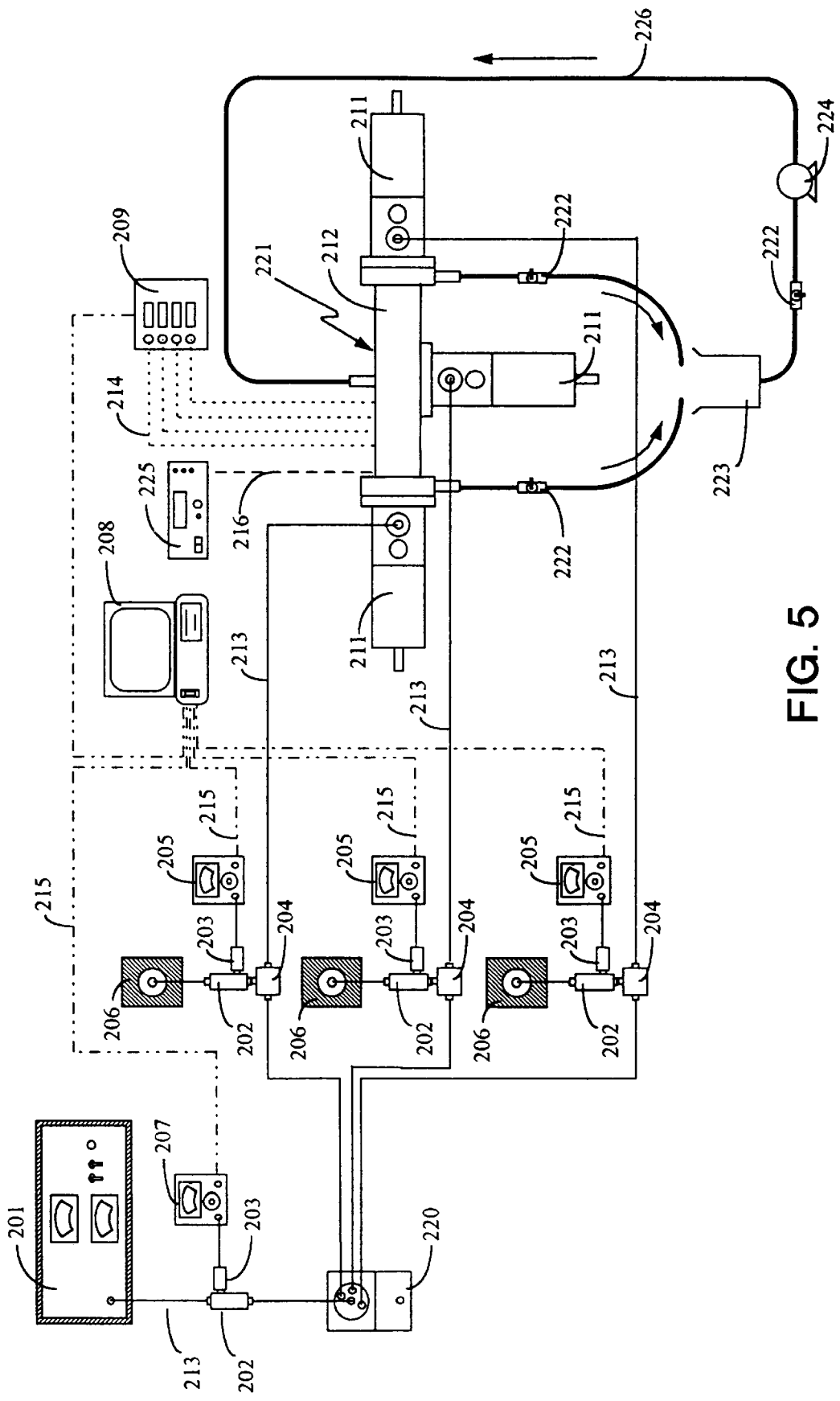
FIG. 5 is a schematic of circuitry and hardware for RTM, with a 120 W magnetron microwave generator 201, directional couplers 202A and 202B, power sensors 203A and 203B, power meter 205, SP5T electromechanical microwave switch 225, circulator 204, terminal resistor 206, external applicator 211, part-shaped cavity 212 with external resistive heaters 211, ball valve 222, heated resin reservoir 223, gear pump 224, LUXTRON thermometry system 209, proportional temperature controller 225 and computer 208. The solid lines are coaxial transmission lines. The dashed lines are thermocouple lines. The dotted lines are silica temperature probes. The dot-dash lines are computer data transmission lines. The heavy solid lines are the heated tubing for resin transfer to cavity 212.
Figure 6A:
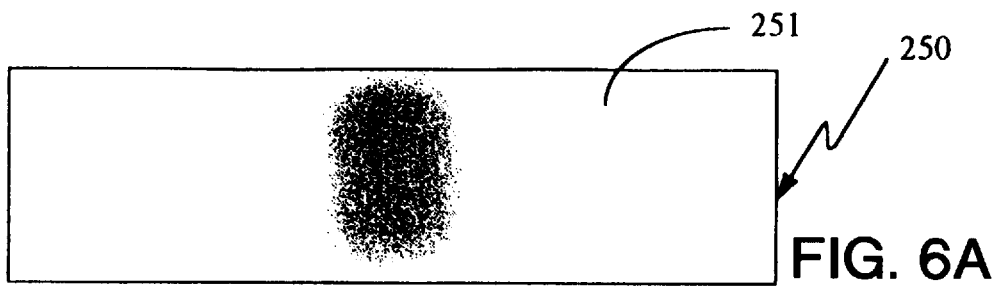
FIGS. 6A to 6C are scanned images of activated thermal paper 251 from multiple layered glass-reinforced polyester plates 250 located near (a) the upper wall (FIG. 6A); plate 8, (b) the center (FIG. 6B); plate 6, and (c) the lower wall (FIG. 6C); plate 2 of the part-shaped cavity 212 with the external applicator 211 located at port A (center top).
Figure 6B:
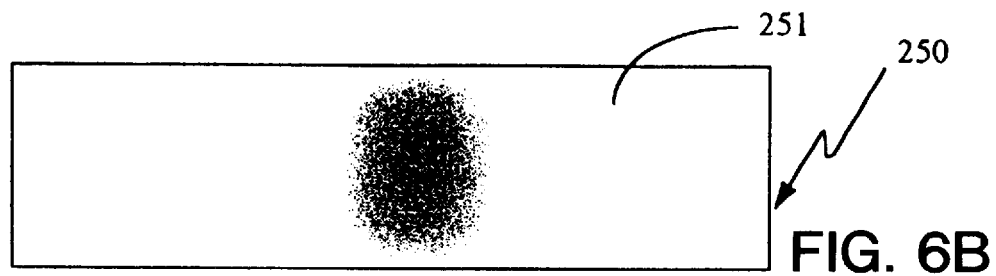
Figure 6C:
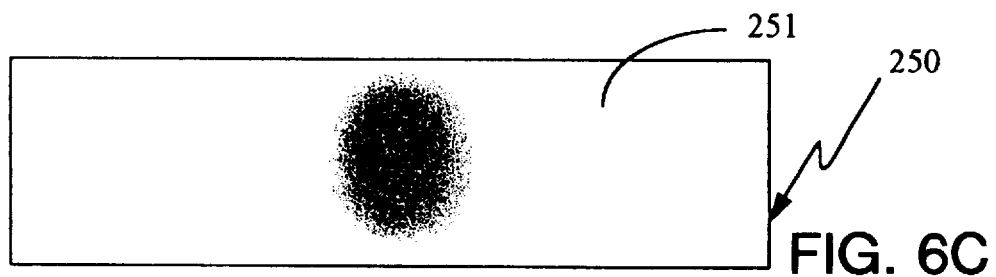
Figure 7:
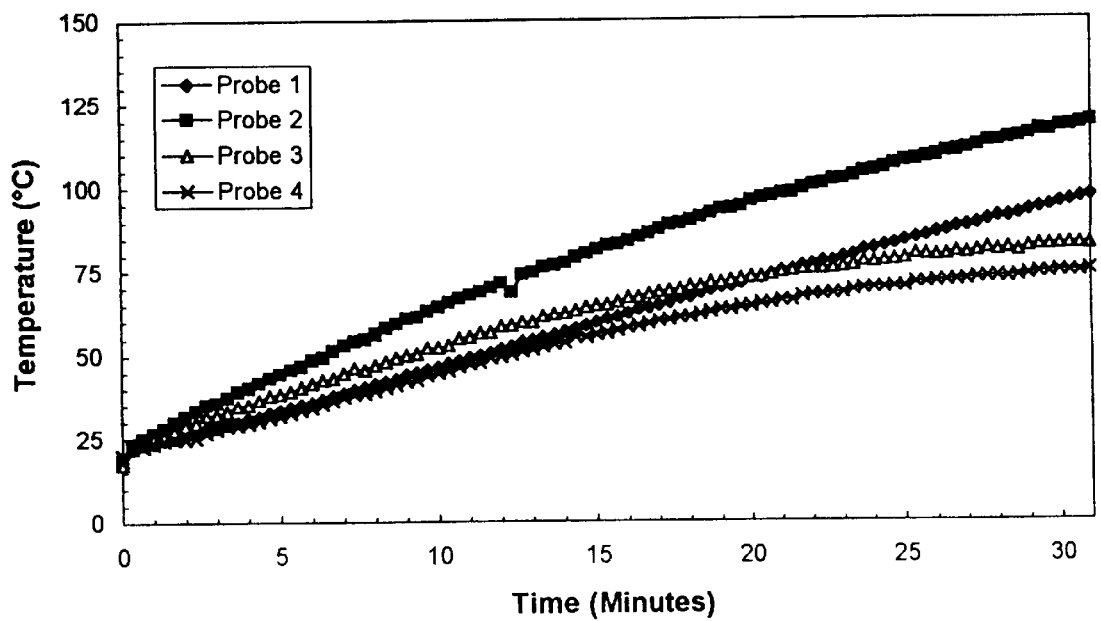
FIG. 7 is a graph showing temperature profiles for the microwave heating of layered glass-reinforced polyester plates 250 in the part-shaped cavity 212 with the external applicator 211 located at port A as in FIGS. 6A to 6C using a 120 Watt magnetron power source as in FIG. 5.
Figure 7A:
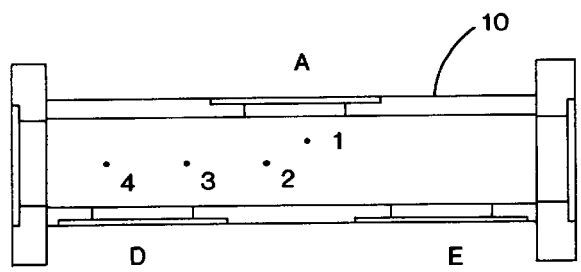
FIG. 7A is a schematic front view of the cavity 212 showing the location of temperatures probes.
Figure 8A:
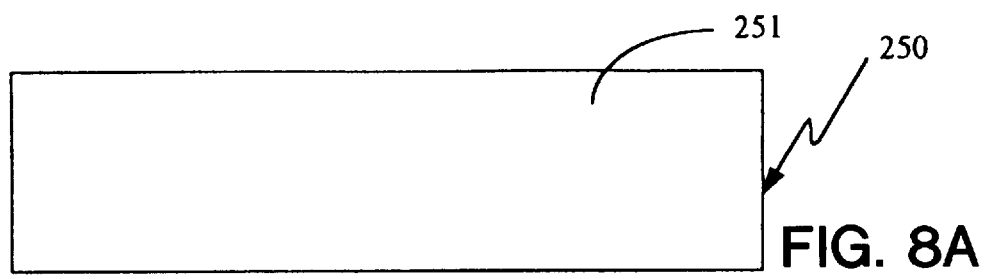
FIGS. 8A to 8C are thermal paper images 251 from glass-reinforced polyester plates 300 located near (a) the upper wall (FIG. 8A); plate 2, (b) the center (FIG. 8B); plate 6, and (c) the lower wall (FIG. 8C); plate 10 of the part-shaped cavity 212 with the external applicator 211 located at port C (right side).
Figure 8B:
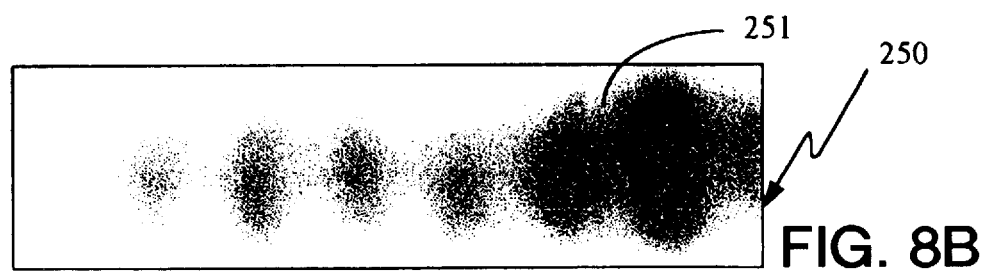
Figure 8C:
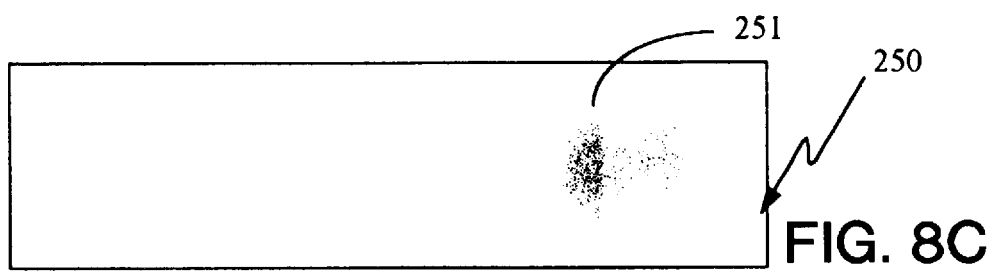

The two circuitry configurations used in the Examples are illustrated in FIGS. 4A and 5. For both configurations, the source 201 operates at 2.45 GHz with variable output power up to 120 Watts. For Examples 1,2 and 3, microwave energy is directed to a single port A, B, C, D, or E through the external applicator 100. For Examples 4 through 7, microwave energy is directed selectively to one of three external applicators 100 via the electromechanical switch 220 (FIG. 5).

Electromagnetic coupling from the external applicator 100 to the part-shaped cavity 10 or 212 is demonstrated in Examples 1 through 5 using fully cured polyester as the heating medium. This shows the heating patterns.

Examples 6 and 7 show curability of a glass-reinforced epoxy composite in the part-shaped cavity 10 or 212. The epoxy resin is a diglycidyl ether of bisphenol A, EPON 828, with an aromatic amine curative, diaminodiphenyl sulfone (DDS). In preparing the resin, 100 parts of EPON 828 is heated to 130° C. while continuously agitating. Twenty-five parts of DDS is slowing added to the resin. The mixture is maintained at 130° C. until all of the DDS dissolves. Upon reaching a homogeneous solution, the resin is transferred to a vacuum oven at 100° C. The resin is degassed under a vacuum for approximately 15 minutes.

Thermosetting resins are well-known to those skilled in the art. Examples of thermosetting resins are epoxy, polyester, urethanes. The resins include a polymer polymerizing agent means, sometimes referred to as a curing agent, and a polymer precursor, usually a monomer or oligomer. The polymers prior to curing are typically liquid and are amenable to processing by Resin Transfer Molding (RTM).

Generally, the articles are formed as a composite of the cured thermoset polymer and a reinforcement, particularly fibers such as carbon or glass fibers. The fibers can be in a tow of fibers, random mats or chopped fibers. The fillers can also be in particulate form. The fillers can be conductive or non-conductive. The field of fillers for polymers is well-known to those skilled in the art.

The gas (air) can be removed from the mold before resin transfer by using vacuum. Preferably, the gas is vented during molding. Parting agents can be used on the walls of the cavity for liquid composite molding. Alternatively, a thin film can be used to line the walls of the cavity.

The glass fibers are in the form of continuous-strand random oriented E-glass fiber mats, UNIFILO U101 (Vetrotex CertainTeed Corporation, Valley Forge, Pa.). Each curing Example used 30 mats to give a fiber weight fraction of approximately 25%.

At room temperature, the viscosity of the prepared resin is greater than 10,000 cP; therefore, to facilitate resin transfer, the reservoir 223 and polypropylene tubing 226, shown in FIG. 5, are heated using heating tape with a step controller (not shown). Resin is slowly transferred to the cavity 212, which has been charged with the fiber mats, via the gear pump 224, powered by a 1-hp electric motor with a variable frequency drive. Upon filling the cavity 212 with the resin, the lower valves 222 are closed and pumping is terminated.

The temperatures of the process material in all Examples were monitored using the LUXTRON 755 (Luxtron Corporation, Santa Clara, Calif.) fluoroptic thermometry system 209. For the curing Examples, the temperature probes were inserted into glass capillary tubes in diagnostic holes 14 with one sealed end to provide a barrier between the resin and the probes. The wall thickness of the capillaries was 0.75 mm.

EXAMPLE 1

Microwave Heating From Port A, Standing Wave

Figure 4B:
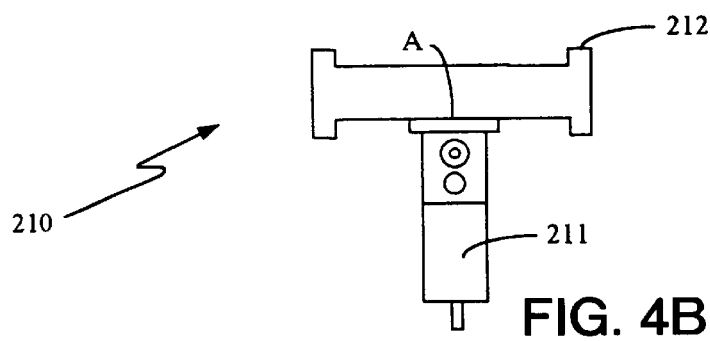
FIGS. 4B, 4C and 4D show mounting of the applicator 211 to various ports A, C or D.

The external applicator 100, 211 is affixed to the central port A, as shown by the configuration in FIG. 4B and all other ports are sealed with brass plates (not shown). During heating, the magnetron is operated at full power, 120 W. Eleven 31.8 cm×8.7 cm×0.32 cm glass-reinforced polyester plates 300 are loaded in the part-shaped cavity to serve as the dielectric heating medium. Four temperature probes are inserted at select axial locations. Qualitative heating patterns were determined by securing thermal paper to each polyester-glass plate. The thermal paper begins to indicate at 60° C. and progressively darkens at higher temperatures. This allows a fingerprint of the heating zones to be taken during a run. The thermal paper images and temperature profiles are shown in FIGS. 6A to 6C and FIGS. 7 and 7A, respectively.

EXAMPLE 2

Microwave Heating From Port C, Standing Wave

Figure 4C:
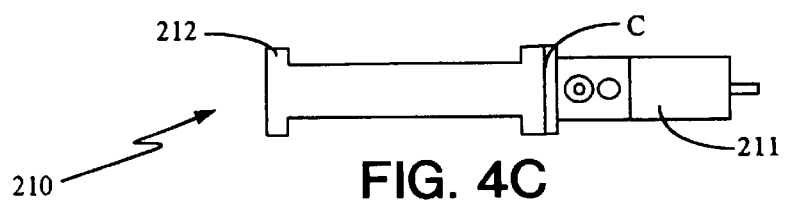
Figure 9:
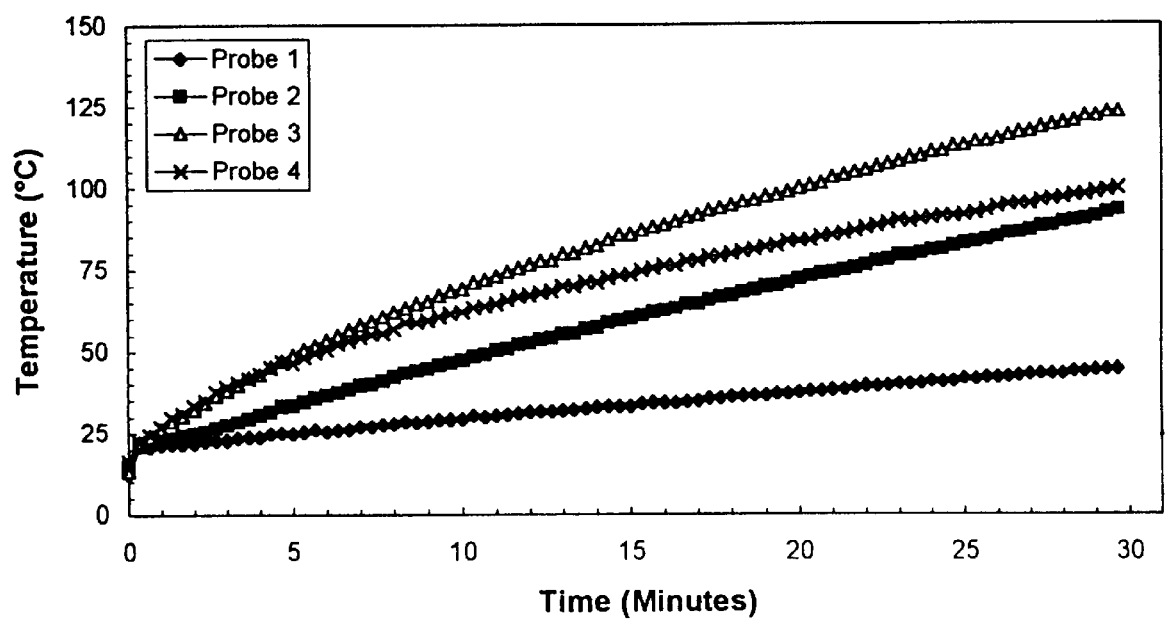
FIG. 9 is a graph showing temperature profiles for the microwave heating of glass-reinforced polyester plates 250 in the part-shaped cavity 212 with the external applicator 211 located at port C using a 120 Watt magnetron power source as in FIG. 5.
Figure 9A:
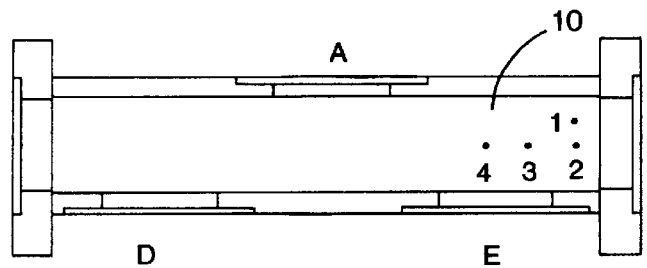
FIG. 9A is a schematic front view of the cavity 212 showing the location of temperature probes.
Figure 10A:
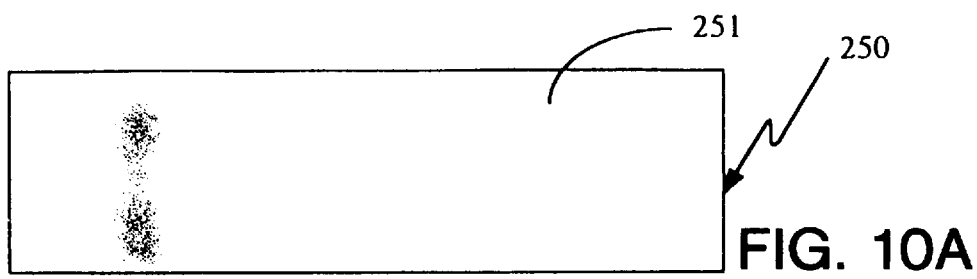
FIGS. 10A to 10C are thermal paper images 251 from glass-reinforced polyester plates 250 located near (a) the upper wall (FIG. 10A); plate 2, (b) the center (FIG. 10B); plate 6, and (c) the lower wall (FIG. 10C); plate 10 of the part-shaped cavity 212 with the external applicator 211 located at port D (off-center bottom left).
Figure 10B:
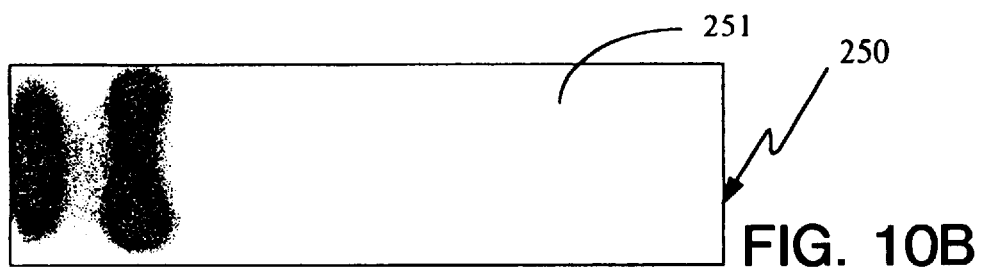
Figure 10C:
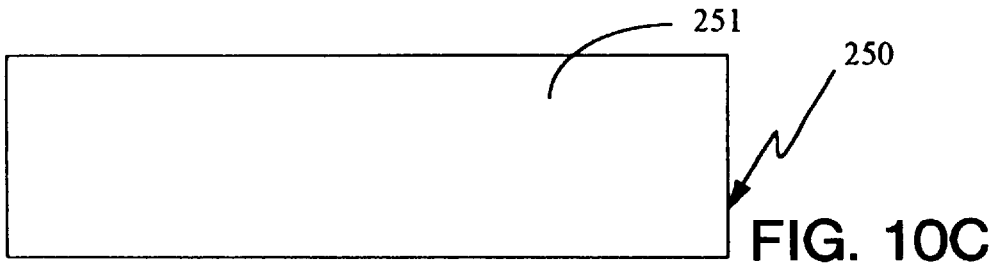

The external applicator 100, 211 is affixed to one of the end ports, as shown in FIG. 4C, and all other ports are sealed with brass plates (not shown). During heating, the magnetron is operated at full power, 120 W. Eleven 31.8 cm×8.7 cm×0.32 cm glass-reinforced polyester plates 300 are loaded in the part-shaped cavity 212 to serve as the dielectric heating medium. Four temperature probes are inserted at select axial locations (FIG. 9A). Qualitative heating patterns are determined by securing thermal paper to each polyester-glass plate. The thermal paper images and temperature profiles are shown in FIGS. 8A to 8C and 9, respectively.

EXAMPLE 3

Microwave Heating From Port D, Standing Wave

Figure 4D:
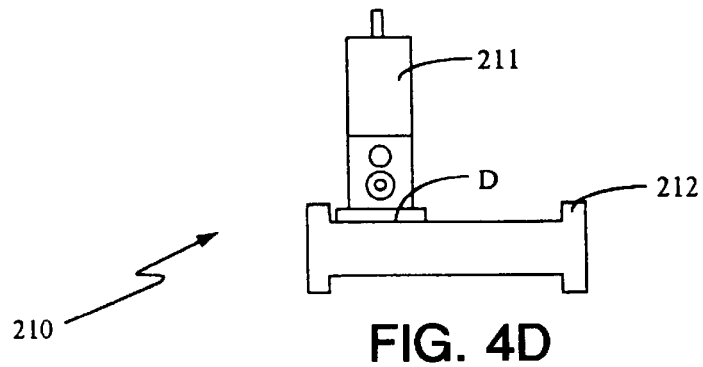
Figure 11:
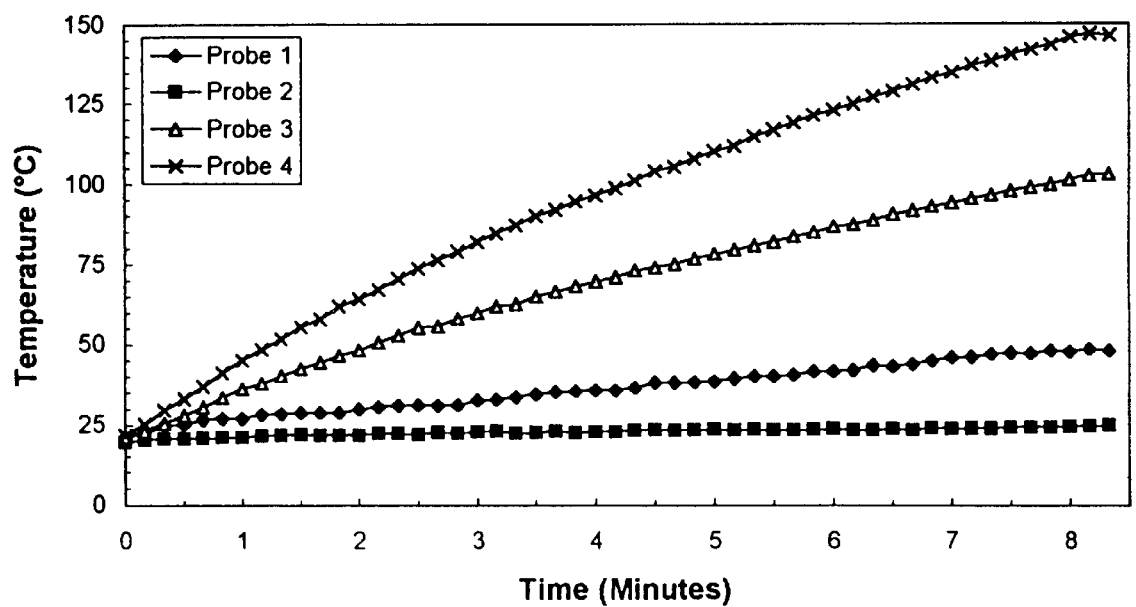
FIG. 11 is a graph showing temperature profiles for the microwave heating of glass-reinforced polyester plates 250 in the part-shaped cavity 212 with the external applicator 211 located at port D using a 120 Watt magnetron power source.
Figure 11A:
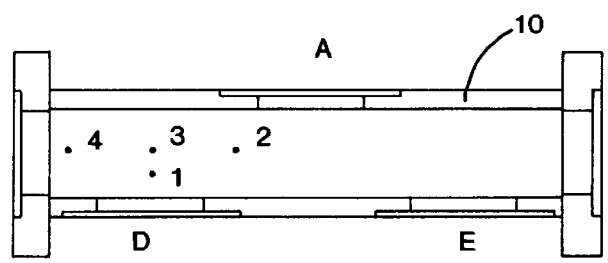
FIG. 11A is a schematic front view of the cavity 10 showing the location of temperature probes.
Figure 12A:
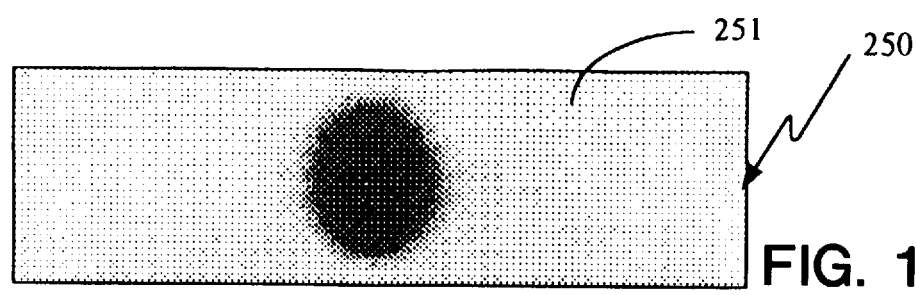
FIGS. 12A to 12C show thermal paper images 251 from glass-reinforced polyester plates 250 located near (a) the upper wall (FIG. 12A); plate 10, (b) the center (FIG. 12B); plate 6, and (c) the lower wall (FIG. 12C); plate 2 of the part-shaped cavity 212 with external applicators 211 located at ports A, B and C. 120 Watts are directed to port A.
Figure 12B:
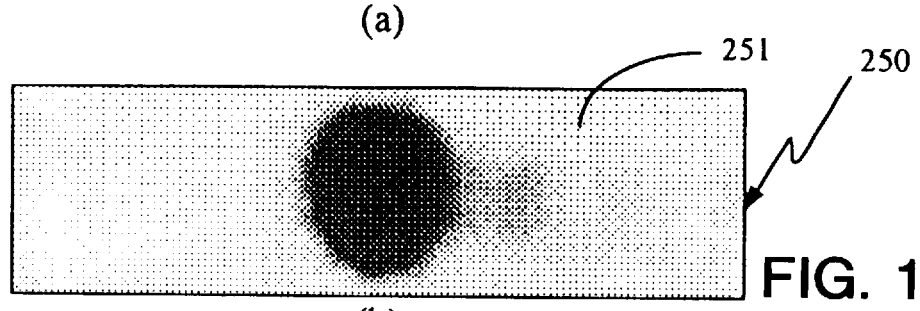
Figure 12C:
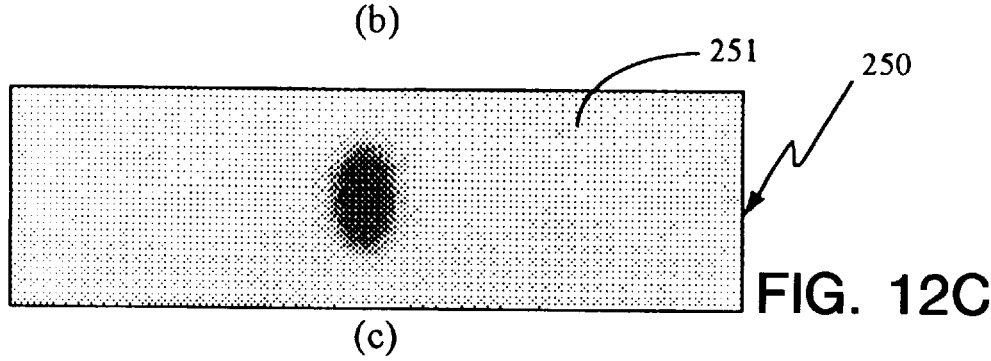

The external applicator 100, 211 is affixed to one of the off-center ports, as shown in FIG. 4D, and all other ports are sealed with brass plates. During heating, the magnetron is operated at full power, 120 W. Eleven 31.8 cm×8.7 cm×0.32 cm glass-reinforced polyester plates 300 are loaded in the part-shaped cavity 212 to serve as the dielectric heating medium. Four temperature probes are inserted at select axial locations as shown in FIG. 11A. Qualitative heating patterns are determined by securing thermal paper to each polyester-glass plate. The thermal paper images and temperature profiles are shown in FIGS. 10A, 10B and 10C and 11, respectively.

EXAMPLE 4

Microwave Heating From Port A, Traveling Wave

Figure 13:
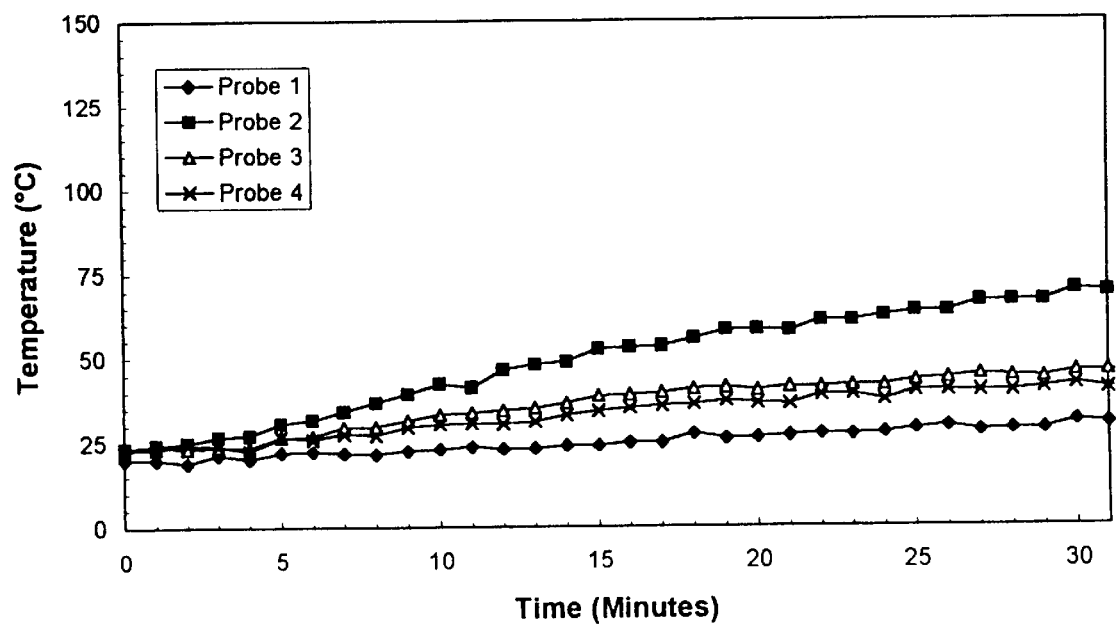
FIG. 13 is a graph showing temperature profiles for the microwave heating of glass-reinforced polyester plates 250 in the part-shaped cavity 212 with external applicators 211 located at ports A, B and C. 120 Watts are directed to port A.
Figure 13A:
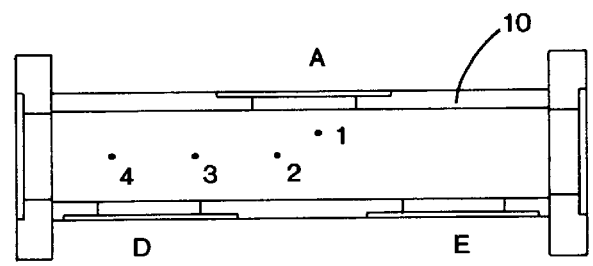
FIG. 13A is a schematic front view of the cavity 10 showing the location of temperature probes.
Figure 14A:
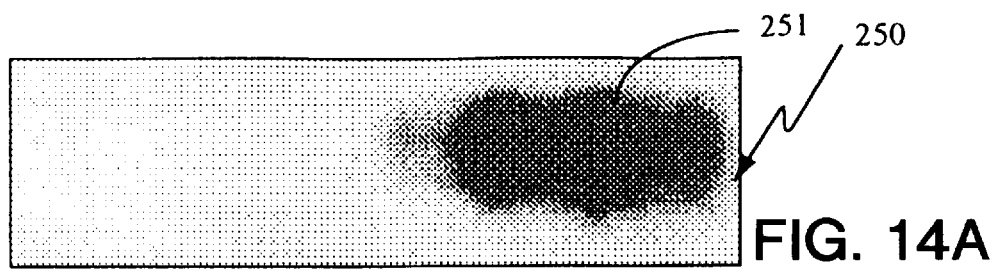
FIGS. 14A to 14C are thermal paper images 251 from glass-reinforced polyester plates 250 located near (a) the upper wall (FIG. 14A); plate 10, (b) the center (FIG. 14B); plate 6, and (c) the lower wall (FIG. 14C); plate 2 of the part-shaped cavity 212 with external applicators 211 located at ports A, B and C. 120 Watts are directed to port C.
Figure 14B:
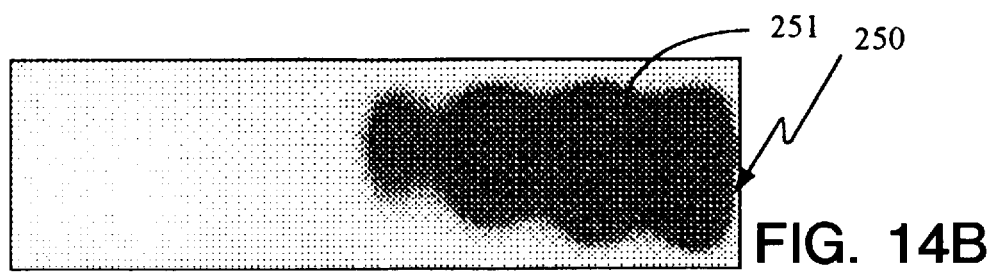
Figure 14C:
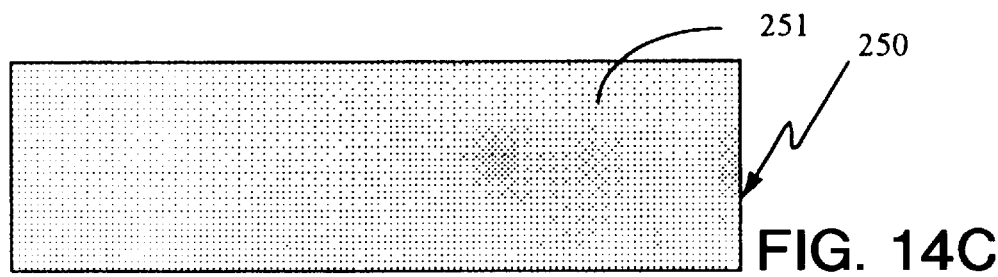

The external applicators 100, 211 are affixed to ports A, B and C. Ports D and E are sealed with brass plates. FIG. 5 illustrates the circuitry employed in this Example. During heating, the magnetron is operated at full power, 120 W, and the power is directed to port A through the SP5T switch. Eleven 31.8 cm×8.7 cm×0.32 cm glass-reinforced polyester plates 300 are loaded in the part-shaped cavity 212 to serve as the dielectric heating medium. Four temperature probes are inserted at select axial locations as shown in FIG. 13A. Qualitative heating patterns are determined by securing thermal paper to each polyester-glass plate. The thermal paper images and temperature profiles are shown in FIGS. 12A, 12B and 12C and 13, respectively.

EXAMPLE 5

Microwave Heating From Port C, Traveling Wave

Figure 15:
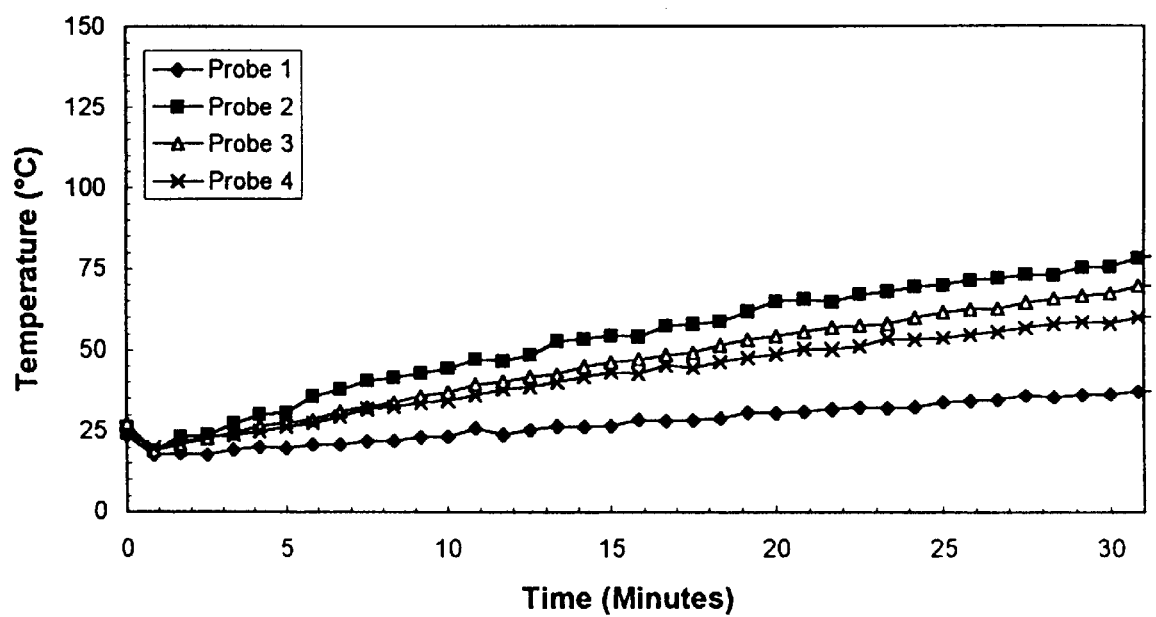
FIG. 15 is a graph temperature of profiles for the microwave heating of glass-reinforced polyester plates 250 in the part-shaped cavity 212 with external applicators 211 located at ports A, B and C. 120 Watts are directed to port C.
Figure 15A:
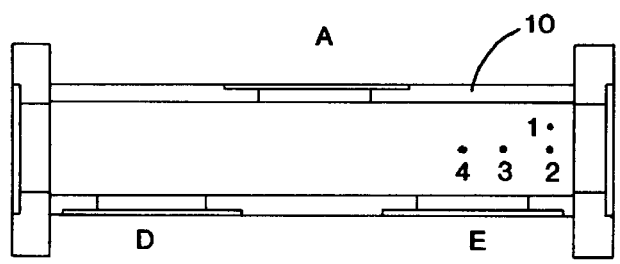
FIG. 15A is a schematic front view of the cavity 10 showing the location of temperature probes.

The external applicators 100, 211 are affixed to ports A, B and C. The remaining ports are sealed with brass plates. FIG. 5 illustrates the circuitry employed in this Example. During heating, the magnetron is operated at full power, 120 W, and the power is directed to port C through the SP5T switch. Eleven 31.8 cm×8.7 cm×0.32 cm glass-reinforced polyester plates 300 are loaded in the part-shaped cavity 10 to serve as the dielectric heating medium. Four temperature probes are inserted at select axial locations as shown in FIG. 15A. Qualitative heating patterns are determined by securing thermal paper to each polyester-glass plate. The thermal paper images and temperature profiles are shown in FIGS. 14A, 14B and 14C and 15, respectively.

EXAMPLE 6

Figure 16:
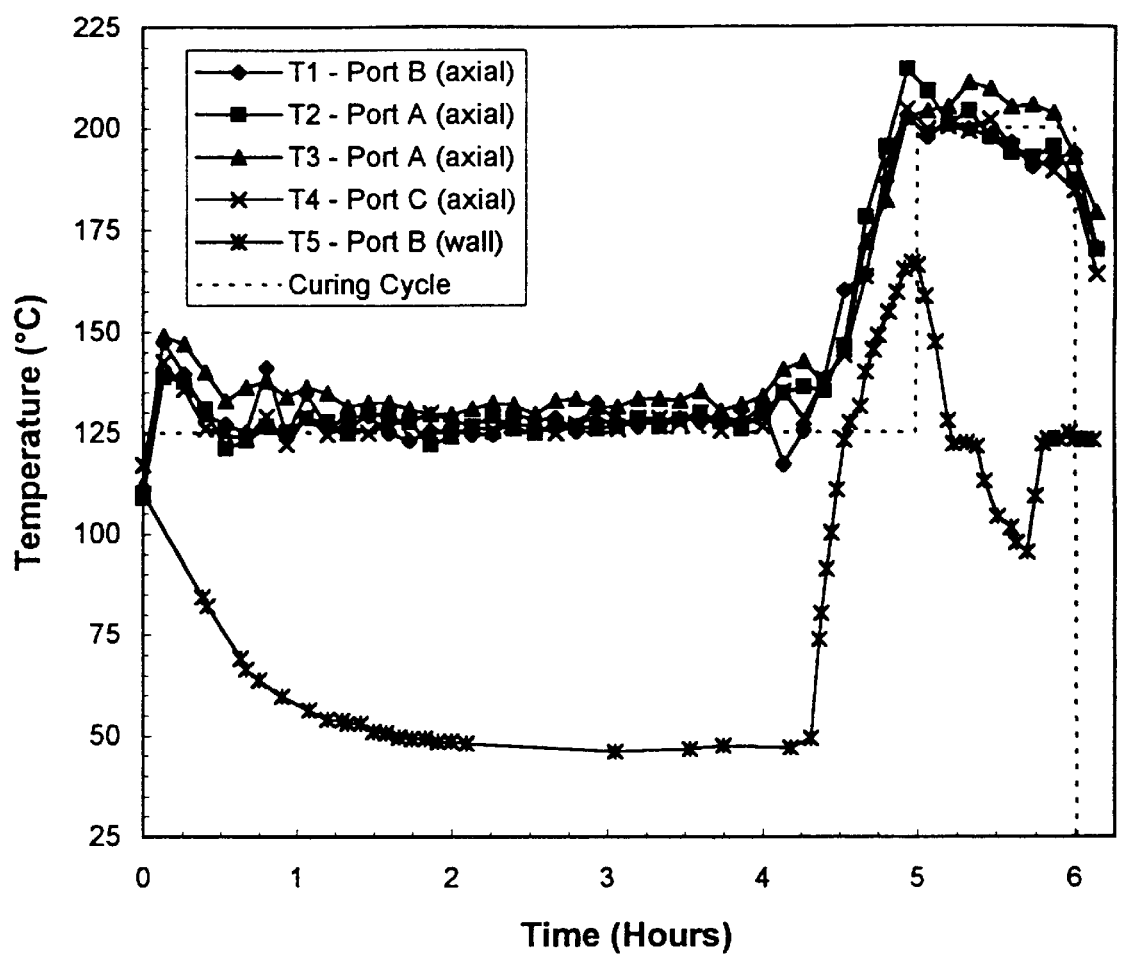
FIG. 16 is a graph showing temperature profiles during microwave curing of glass-reinforced Diglycidyl Ether of Bisphenol A (DGEBA) with a diaminodiphenyl Sulfone (DDS) curing agent in the partshaped cavity 212.

Curing Via Microwave Heating 2014.8 g of EPON 828 (Shell Chemical Company, Houston, Tex.) is mixed with 504.1 g of DDS. The part-shaped cavity 10 is lined with a nylon vacuum bag to prevent resin leakage through the diagnostic holes 14 during resin transfer 11. Teflon plates serve as a low loss barrier between the external applicator 100, 211 and the cavity 10, 212 at ports A, B and C. The cavity 212 is heated to 100° C., and the resin is transferred to the cavity 10. During cure, select axial locations are maintained at 125° C. using only microwave radiation by switching the energy with the SP5T switch 220. The post cure temperature, 200° C., is attained with the assistance of the external resistive heaters 221 which heat by conduction. FIG. 16 illustrates the various temperature profiles.

EXAMPLE 7

Figure 17:
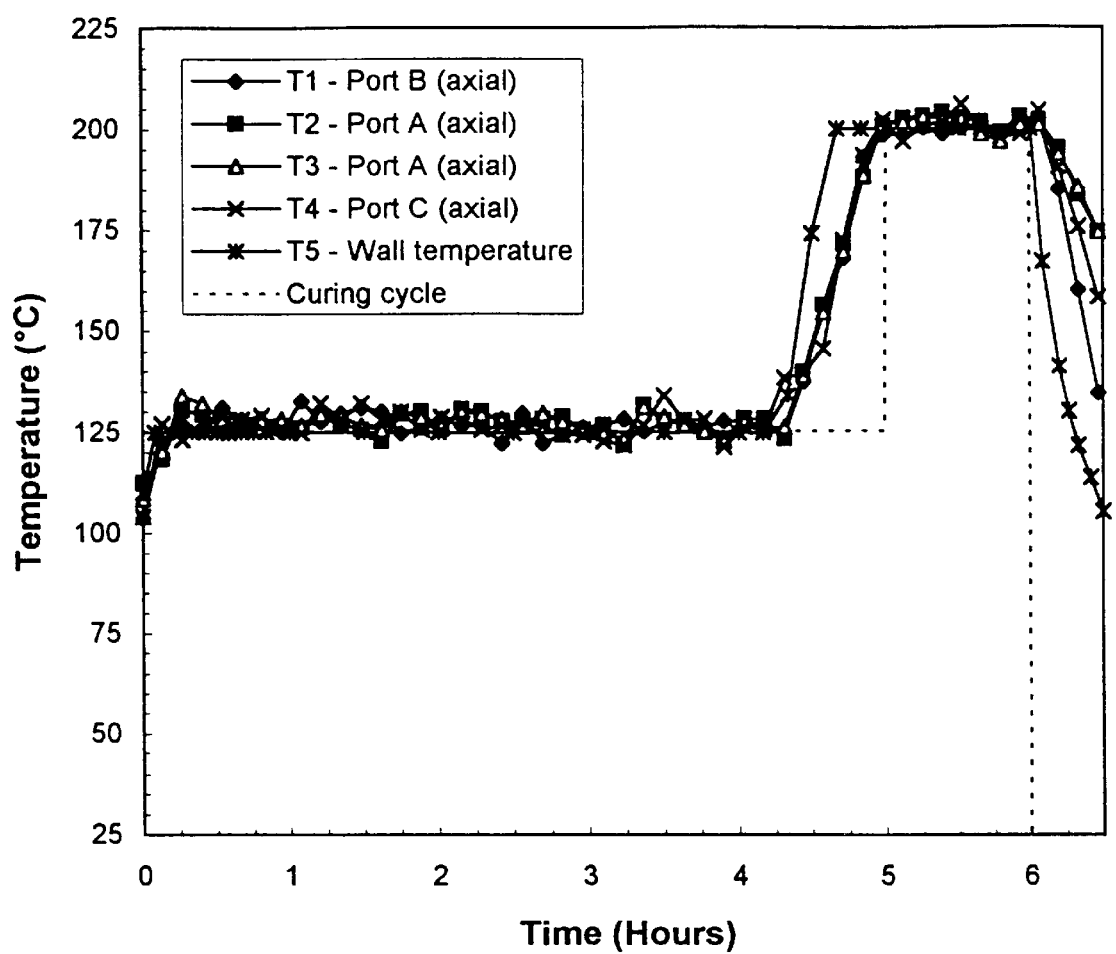
FIG. 17 is a graph showing temperature profiles during curing of glass-reinforced DGEBA/DDS in the part-shaped cavity 212 using hybrid heating.
Figure 18:
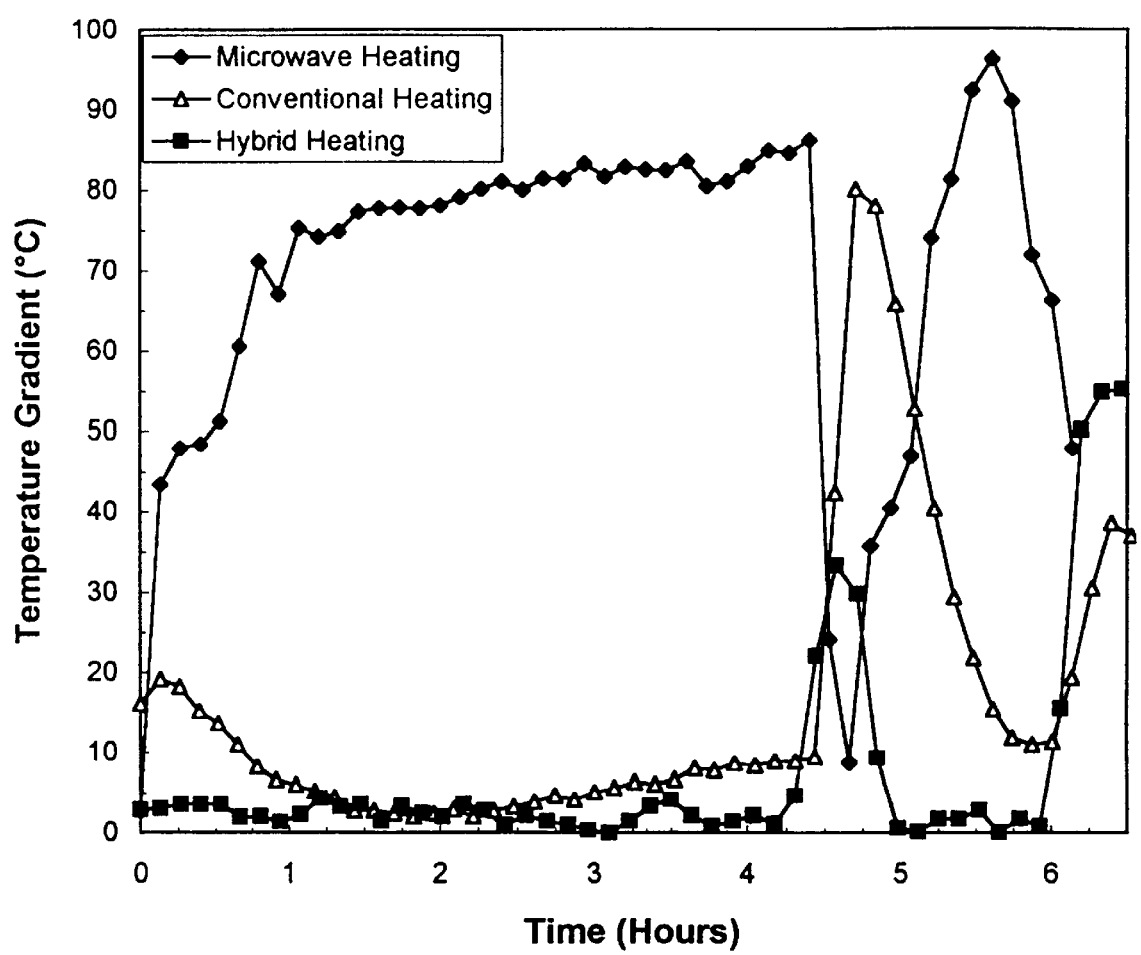
FIG. 18 is a graph showing comparison of average axial temperature-to-cavity wall temperature gradient using three heating methods in the part-shaped cavity 212: microwave, conventional, and hybrid heating with microwave and conventional heating.
Figure 19A:
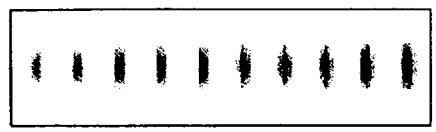
FIGS. 19A to 19G shows E-field intensity patterns in the cavity for a dielectric filled cavity (4.3-j 0.049).
Figure 19B:
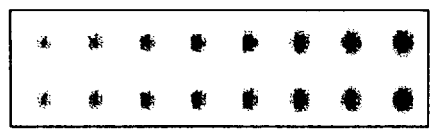
Figure 19C:
Figure 19D:
Figure 19E:
Figure 19F:
Figure 19G:

Curing Via Hybrid Heating 1972.0 g of EPON 828 (Shell Chemical Company, Houston, Tex.) is mixed with 492.9 g of DDS. To prevent resin leakage through the diagnostic holes 14 during resin transfer, all holes were sealed with RTV silicone sealant. To aid in part removal, the cavity 10, 212 is treated with Mono-Coat RPM 711 sealer or surface irregularities and Mono-Coat RPM 115 (Chem-Trends, Howell, Mich.) mold release agent. TEFLON plates serve as a low loss barrier between the external applicator 100, 211 and the cavity 10, 212 at ports A, B and C. The cavity 10 is heated to 100° C., and the resin is transferred to the cavity 10. During cure, select axial locations and the wall temperature are maintained at 125° C. using microwave radiation and resistive heaters 221. Both energy sources were employed during post-cure at 200° C. as well. FIG. 17 illustrates the various temperature profiles for hybrid heating. A comparison of the axial-to-wall temperature gradients from using three curing methods (i.e., microwave, conventional, and hybrid heating) in the part-shaped cavity 10 is shown in FIG. 18.

As shown in FIGS. 19A to 19G, different modes will have different heating patterns. In order to generate the desired heating pattern, a corresponding mode or modes needs to be generated. In order to excite a certain mode inside the mold, the source frequency has to be above the cutoff frequency for that mode. For a rectangular mold filled with materials having dielectric properties $\epsilon=\epsilon_o(\epsilon'-j\epsilon'')$, the cutoff frequency for TEmn mode (m,n=0,1,2 . . . ) and TMmn mode (m,n=1,2,3 . . . ) is $$f_{m,n} = \frac{1}{2\sqrt{\mu\epsilon_o\epsilon'}} \sqrt{\left(\frac{m}{a}\right)^2 + \left(\frac{n}{b}\right)^2}$$

where $f_{m,n}$—the cutoff frequency for TEmn or TMmn mode in Hz, a and b—the cross-sectional dimensions of the mold, $\mu$—the permeability of the free space $4\Pi 10^{-7}$ H/m, and $\epsilon_0$—the permittivity of the free space, $8.854 \times 10^{-12}$ F/m.

For a=8.7 cm and b=3.8 cm, the cutoff frequencies for various modes as a function of the dielectric constant are shown in FIG. 21.

Figure 20:
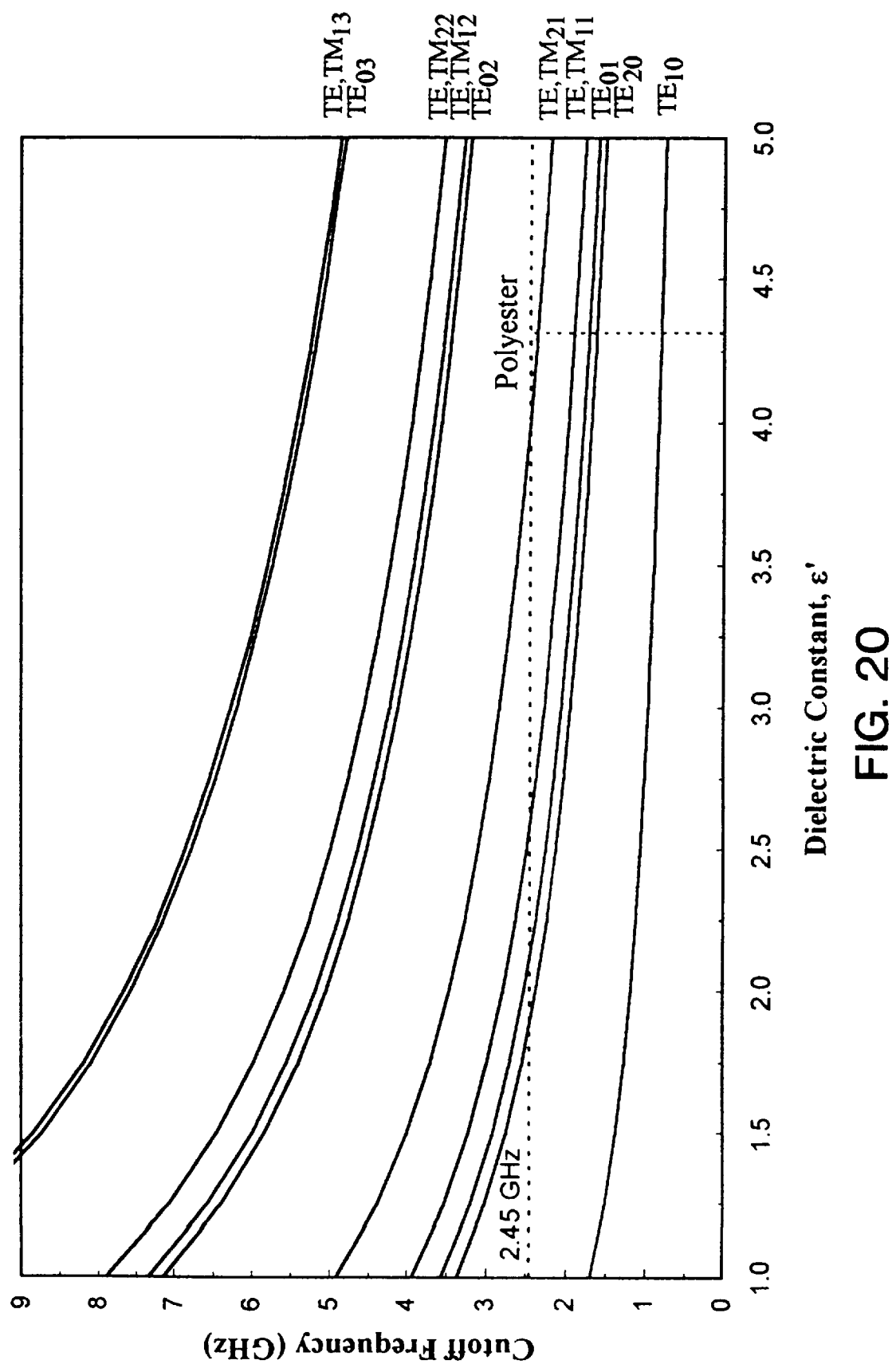
FIG. 20 is a graph showing the cutoff frequency as a function of dielectric constant in the part shaped cavity 10 for various modes of propagation.

As shown in FIG. 20, five modes could possibly propagate through the cavity filled with material with a dielectric constant of 4.3. As is evident from comparing thermal paper images to the theoretical E-field patterns, the $TE_{01}$ mode propagates through the cavity filled with glass-reinforced polyester plates ($\epsilon=4.3-j\,0.049$). The E-fields in the external applicator and the cavity only have an X-component. The $TE_{10}$ mode could propagate through the cavity by rotating the external applicators 90°. This would create an E-field with a Y-component only. For other (i.e. circular) mold shapes, similar analysis can be done.

Figure 21A:
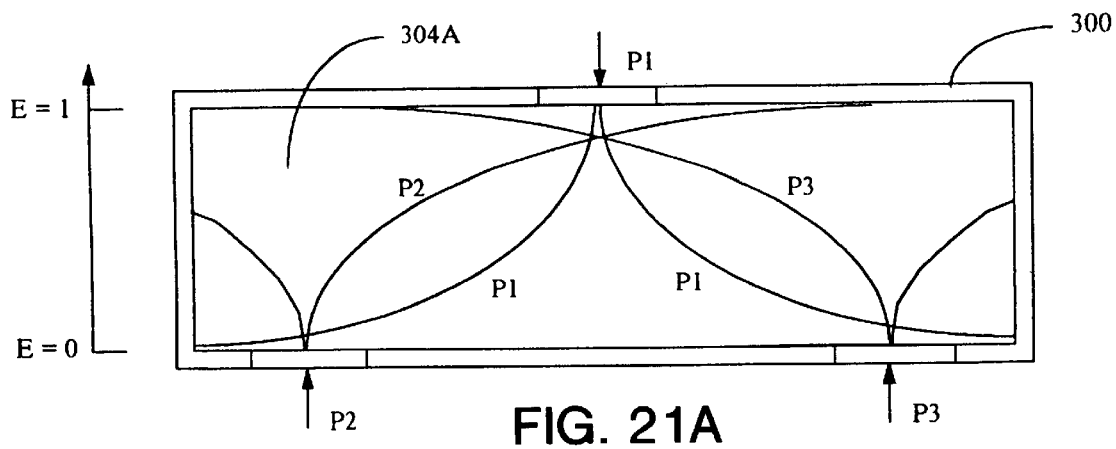
FIGS. 21A, 21B and 21C are schematic views of cavities for introducing electromagnetic waves through ports p1, p2 and p3.
Figure 21B:
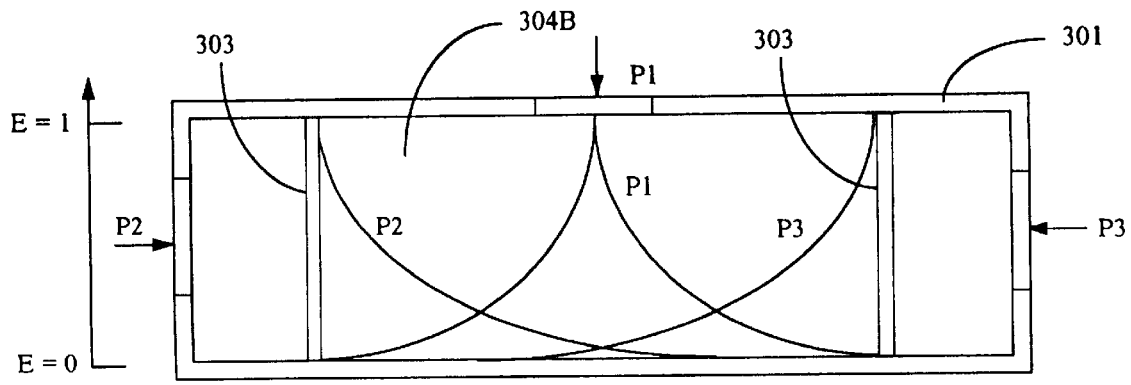
Figure 21C:
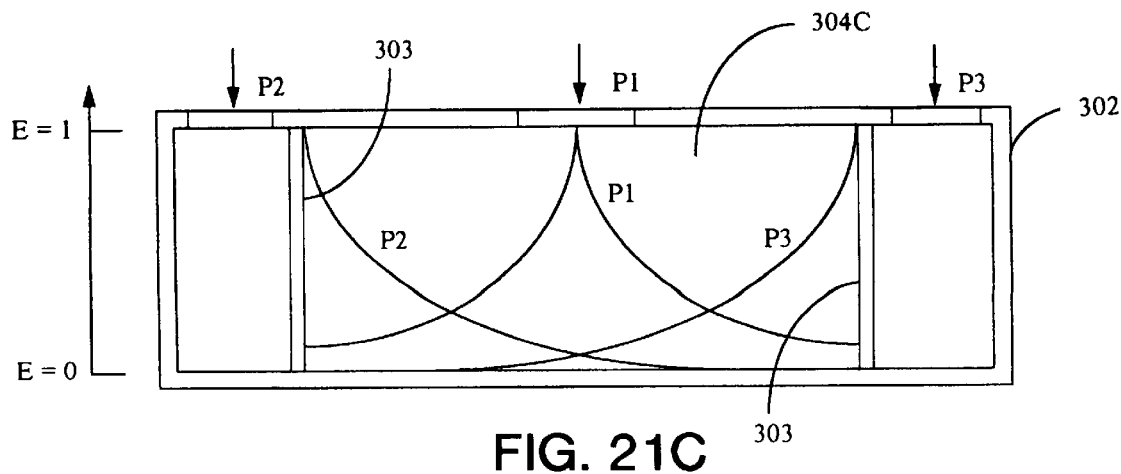

FIGS. 21A, 21B and 21C show possible port placement configurations for a three-port mold. FIGS. 21A, 21B and 21C show three ports (p1, p2 and p3) in chambers 300, 301 and 302 in FIGS. 21B and 21C. A cover 303 is used to limit the volume in the cavities 304A, 304B and 304C. E is the field strength.

Figure 22:
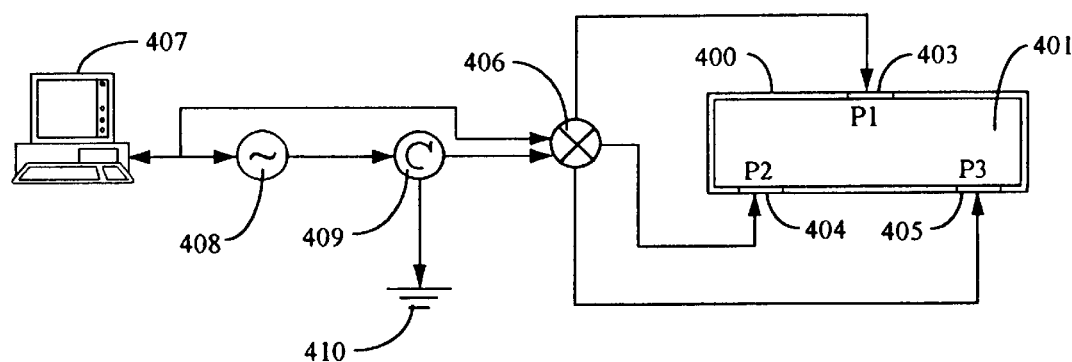
FIG. 22 is a schematic view of an apparatus and circuit for controlling the modulation of the microwaves into the ports p1, p2 and p3 into cavity 400.
Figure 23:
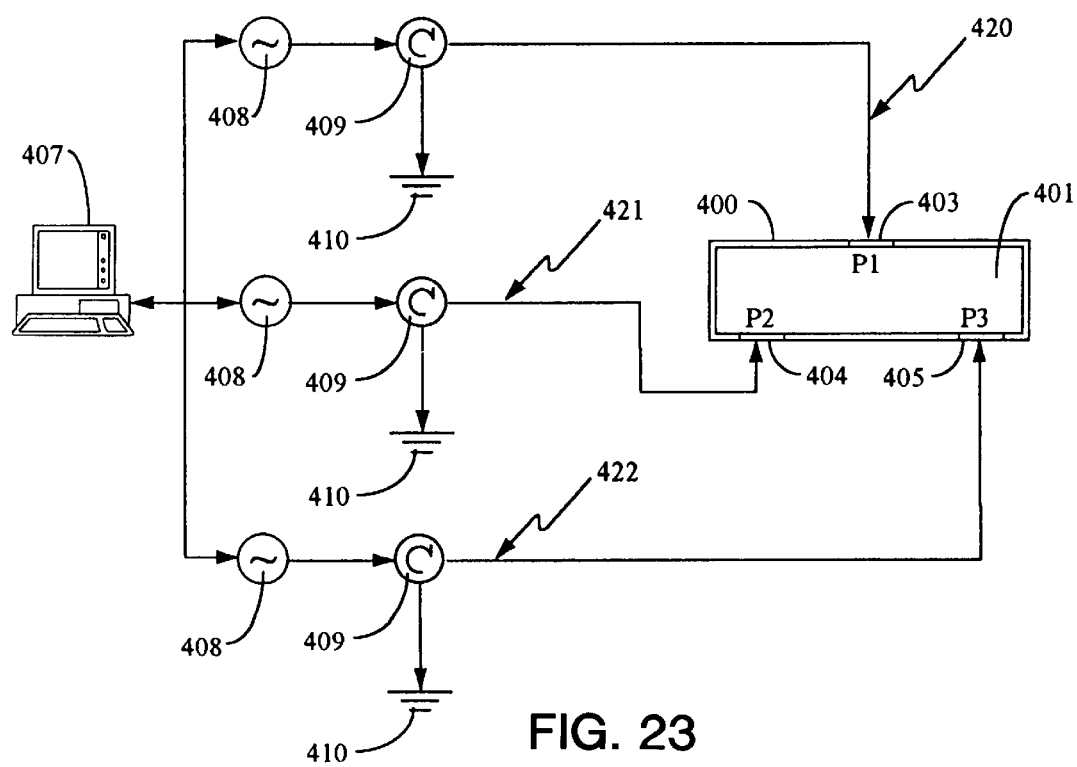
FIG. 23 is a schematic view of an apparatus and circuits for individual control of ports p1, p2 and p3 into cavity 400.

FIGS. 22 and 23 show the microwave circuitry and hardware for a three-port mold using three microwave sources (FIG. 23) or one microwave source (FIG. 22). The power couplings can be in the forms of antenna, aperture and internal cavity applicator. The tuning required during cure due to the change of the material dielectric properties can be accomplished through the change of input microwave frequency, the size of internal applicator, the depth of antenna or the size and shapes of aperture.

FIG. 22 shows a mold 400 with a cavity 401 and multiple ports (p1, p2 and p3) fed by microwave applicators 403, 404 and 405. A switch 406 controls which port p1, p2 and/or p3 receives the microwaves and a computer 407 controls a microwave source 408 leading to a circulator 409 leading to the switch 406 and to a dummy load 410. The microwaves in the cavity 401 are controlled by the switch 406. FIG. 23 shows another generalized system. The common ports are marked as in FIG. 3, except that there are separate circuits 420, 421 and 422 controlled by the coupler 407. The advantage of this system is that the computer 407 functions as the switch.

This invention can be used in the batch productions of simple and complex shaped RTM and SRIM parts including bar parts with cross section of square, rectangular, circular, elliptic, triangular, and polygons, and plates such as circuit boards. This invention can be applied to the continuous productions such as pultrusion. A combination of ports, coupling methods, variable frequency and microwave sources can be controlled in a designed cycle.

Port locations sides ends

Coupling methods aperture antenna internal applicator

Frequencies

915 MHz 2.45 GHz variable frequency source

Controlled process cycle (input power at all ports simultaneously or alternatively; using one microwave source or multiple microwave sources). The microwave heating inside the mold can be combined with thermal heating outside the mold.

It is intended that the foregoing description be only illustrative of the present invention and that the present invention be limited only by the hereinafter appended claims.

We claim:

1. A method for forming an article of a cured thermoset polymer which comprises:

(a) providing a metal mold with metal walls defining a cavity, with an injection port for introducing a curable liquid polymer composition into the cavity, with multiple ports with dielectric covers which provide apertures into the cavity and which allow transmission of electromagnetic waves selected from the group consisting of radiofrequency waves and microwaves into the cavity and with means for removing gas from the cavity before or during injection;

removing gas from the cavity;

(c) introducing the liquid polymer composition through the injection port into the cavity;

(d) heating to induce curing of the liquid polymer composition by introducing the electromagnetic waves through selected said multiple ports and dielectric covers so as to provide uniform heating in the cavity and to cure the liquid polymer composition and form the article; and (e) removing the article from the mold.

2. The method of claim 1 wherein the liquid polymer composition is an epoxy resin.

3. The method of claim 1 wherein the electromagnetic waves are microwaves.

4. The method of claim 3 wherein the mold has opposed ends and at least one side between the ends and wherein an applicator for the microwaves is mounted on both ends and on the side between the ends and wherein the applicators provide uniform heating of the curable liquid polymer composition in the mold.

5. The method of claim 4 wherein each of the applicators has a sliding short and excitation probe which provide adjustment to a pre-selected mode of the microwaves during the curing.

6. The method of claim 1 wherein the cavity is lined with a sheet of a dielectric material as a film so that the article is removed from the mold with the film.

7. The method of claim 1 wherein a parting agent is applied to the cavity.

8. The method of claim 1 wherein fibers are provided in the mold before the curable liquid polymer composition is introduced which are bonded together by the curable liquid polymer composition.

9. The method of claim 1 wherein heating means is provided on an outside surface of the mold to heat the mold by conduction during the curing in step (d).

10. The method of claim 3 wherein the mold is heated with a heating means on an outside surface of the mold which heats by conduction during the curing.

11. The method of claim 1 wherein a parting agent is provided on internal walls of the mold into which the polymer is injected.

* * * * *